(12) United States Patent
Kneckt et al.

(10) Patent No.: US 12,279,171 B2
(45) Date of Patent: Apr. 15, 2025

(54) OPERATING CHANNEL VALIDATION

(71) Applicant: Apple Inc., Cupertino, CA (US)

(72) Inventors: Jarkko L. Kneckt, Los Gatos, CA (US); Jinjing Jiang, San Jose, CA (US); Qi Wang, Sunnyvale, CA (US); Su Khiong Yong, Palo Alto, CA (US); Tianyu Wu, Fremont, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 17/844,570

(22) Filed: Jun. 20, 2022

(65) Prior Publication Data

US 2022/0418022 A1    Dec. 29, 2022

Related U.S. Application Data

(60) Provisional application No. 63/214,096, filed on Jun. 23, 2021.

(51) Int. Cl.
| | |
|---|---|
| *H04W 76/15* | (2018.01) |
| *H04L 5/00* | (2006.01) |
| *H04W 36/06* | (2009.01) |
| *H04W 72/0453* | (2023.01) |
| *H04W 84/12* | (2009.01) |

(52) U.S. Cl.
CPC .......... *H04W 36/06* (2013.01); *H04L 5/0098* (2013.01); *H04W 72/0453* (2013.01); *H04W 76/15* (2018.02); *H04W 84/12* (2013.01)

(58) Field of Classification Search
CPC . H04W 36/06; H04W 72/0453; H04W 76/15; H04W 84/12; H04W 56/0015; H04W 88/12; H04L 5/0098; H04L 5/0051; H04B 7/024
See application file for complete search history.

(56) References Cited

U.S. PATENT DOCUMENTS

| | | | |
|---|---|---|---|
| 2021/0050999 A1* | 2/2021 | Huang | ............ H04L 9/14 |
| 2021/0112414 A1* | 4/2021 | Huang | ............ H04W 12/122 |
| 2021/0212141 A1 | 7/2021 | Chu | |
| 2021/0250848 A1 | 8/2021 | Seok | |
| 2021/0274500 A1 | 9/2021 | Cariou | |
| 2023/0046270 A1* | 2/2023 | Huang | ............ H04L 1/22 |

(Continued)

FOREIGN PATENT DOCUMENTS

| | | |
|---|---|---|
| CN | 112492581 | 3/2021 |
| CN | 112512135 | 3/2021 |

(Continued)

OTHER PUBLICATIONS

Preliminary Report on Patenability for PCT Patent Application No. PCT/US2022/034804; Jan. 4, 2024.

(Continued)

*Primary Examiner* — Thai Nguyen
(74) *Attorney, Agent, or Firm* — Kowert, Hood, Munyon, Rankin & Goetzel, P.C.

(57) ABSTRACT

Methods, systems and apparatuses for performing a channel validation by an access point (AP) multi-link device (MLD) and non-AP MLD are described. An AP MLD may transmit information about multiple affiliated APs. A non-AP MLD and AP MLD may validate multiple links for communication.

20 Claims, 28 Drawing Sheets

(56) References Cited

U.S. PATENT DOCUMENTS

2023/0156578 A1   5/2023   Kim
2023/0328619 A1   10/2023  Dong

FOREIGN PATENT DOCUMENTS

| CN | 112714472 | | 4/2021 | |
| KR | 20210052234 | | 5/2021 | |
| WO | WO-2021011476 A1 | * | 1/2021 | ............ H04W 48/12 |
| WO | 2021049817 | | 3/2021 | |

OTHER PUBLICATIONS

INTEL "Resolutions for CC34 CIDs for channel switching quieting"; IEEE 802.11-20/0481r5; Jul. 2021.
Cariou, Laurent, IEEE P802.11 Wireless LANs, "Resolutions for CC34 CIDs for channel switching quieting", Date: Feb. 8, 2021, Jul. 2022 doc.: IEEE 802.11-18/0149r05, 12 pgs.
Montemurro, Michael, IEEE P802.11 Wireless LANs, "TGbe CC-34", Date: Apr. 8, 2021, Apr. 2021 doc.: IEEE 802.11-21/0483r3, 43 pgs.
Torab, et al., IEEE P802.11 Wireless LANs, "Comment resolution for ML Reconfiguration (light version)", Date: Jun. 18, 2021, Jun. 2021 doc.:IEEE 802.11-21/0534r5, 8 pgs.
Partial International Search Report for PCT Patent Application No. PCT/US2022/034804; 18 pages; Oct. 5, 2022.
Facebook "ML Reconfiguration"; IEEE 802.11-20/1554R4; 26 pages; Jan. 2021.
LG Electronics "Multi-link Management"; IEEE 802.11-19/1943r9; 16 pages; Nov. 2019.
Office Action for CN Application No. 202280005016.4; Nov. 26, 2024.

* cited by examiner

FIG. 14

| BSS Parameters | | | | | | |
|---|---|---|---|---|---|---|
| OCT Recommended | Same SSID | Multiple SSID | Transmitted SSID | Member of ESS with 2.4/5 GHz Co-located AP | Unsolicited Probe Responses Active | Co-Located AP | Reserved |

FIG. 15

TBTT Info Header

| TBTT Info Field Type | Filtered Neighbor AP | Reserved | TBTT Info Count | TBTT Info Length |
|---|---|---|---|---|

FIG. 16

MLD Parameters

| MLD ID | Link ID | Change Sequence | Reserved |
|---|---|---|---|
| 8 bits | 4 bits | 8 bits | 4 bits |

FIG. 17

Multi-Link Element Format

| Element ID (=(255)) | Length | Element ID Extension | Multi-Link Control | Common Info | Link Info | | |
|---|---|---|---|---|---|---|---|
| | | | | | Per-STA Profile x | Per-STA Profile y | ... | Vendor Specific |

FIG. 18

Multi-Link Control

| Type (3 bits) 0=Basic | MLD MAC Address Present (1 bit) | Link ID Info Present (1 bit) | BSS Parameters Change Count Present (1 bit) | Medium Synchronization Delay Information Present (1 bit) | EML Capabilities Present (1 bit) | MLD Capabilities Present (1 bit) | Reserved (6 bits) |
|---|---|---|---|---|---|---|---|

FIG. 19

| Common Info | | | | |
|---|---|---|---|---|
| MLD MAC address (0 or 6 Octets) | Link ID Info (0 or 1 Octets) | BSS Parameters Change Count (0 or 1 Octets) | Medium Synchronization Delay Information (0 or 2 Octets) | EML Capabilities (0 or 2 Octets) | MLD Capabilities (0 or 2 Octets) |

FIG. 20

| Medium Synchronization Delay Information | | |
|---|---|---|
| Medium Synchronization Delay (8 bits) | Medium Synchronization OFDM ED Threshold (4 bits) | Medium Synchronization Maximum Number of TXOPs (4 bits) |

FIG. 21

| EML Capabilities | | | | | |
|---|---|---|---|---|---|
| EMLSR Support (1 bit) | EMLSR Delay (3 bits) | EMLMR Support (1 bit) | Transmission Timeout (4 bits) | Reserved (4 bits) | EMLMR RX NSS (4 bits) | EMLMR TX NSS (4 bits) |

FIG. 22

| MLD Capabilities | | | |
|---|---|---|---|
| Maximum Number of simultaneous links (4 bits) | EMLSR Support (1 bit) | TID-To Link Mapping Negotiation Support (2 bits) | Frequency Separation for NSTR (5 bits) | Reserved (4 bits) |

| Multi-Link Element Format | | | | | | | |
|---|---|---|---|---|---|---|---|
| Element ID (255) | Length | Element ID Extension | Multi-Link Control | Common Info | Link Info | | |
| | | | | | Per-STA Profile x | Per-STA Profile y | ... | Vendor Specific |

| Subelement ID | Length | STA Control | Per-STA Profile | | | | | | | |
|---|---|---|---|---|---|---|---|---|---|---|
| | | | STA Info | | | | | STA Profile | | |
| | | | STA MAC address (0 or 6 Octets) | Beacon Interval (0 or 2 Octets) | DTIM (0 or 1 Octet) | DTIM (0 or 1 Octet) | NSTR (2, 1 or 0 Octets) | Capability Information | Element 1 | ... | Element n | Non-inheritance element (optional) |

FIG. 25

STA control

| Link ID (4 bits) | Complete Profile (1 bit) | MAC Address Present (1 bit) | Beacon Interval (1 bit) | DTIM Info Present (1 bit) | NSTR Link Pair Present (1 bit) | NSTR Bitmap Size (1 bit) | Reserved (6 bits) |

| Link specific information | Reduced Neighbor Report | Basic-varient multi-link element + Per-STA profiles for affiliated APs + bit to signal whether change in parameter values |

FIG. 32

| Link specific information | Reduced Neighbor Report | Basic-varient multi-link element + Per-STA profiles for affiliated APs + bit to signal whether change in parameter values | Reconfiguration varient multi-link element + Per-STA profiles for AP1 after channel switch |

FIG. 33

| Type subfield value | Multi-Link element variant name |
|---|---|
| 0 | Basic |
| 1 | Probe Request |
| 2 | Reconfiguration |
| TBD | Reserved |

Type subfield encoding

FIG. 34

| Subelement ID | Name | Extensible |
|---|---|---|
| 0 | Per-STA Profile | Yes |
| 1-220 | Reserved | |
| 221 | Vendor Specific | Vendor defined |
| 222-255 | Reserved | |

FIG. 35

| Link ID | Complete Profile | New Link ID | Delete Request | Reserved |
|---|---|---|---|---|
| 4 | 1 | 4 | 1 | 6 |

Bits:

When transmitted by a non-AP STA

FIG. 36

| Link ID | Complete Profile | New Link ID | Delete Imminent | Reserved | Delete Timer |
|---|---|---|---|---|---|
| 4 | 1 | 4 | 1 | 6 | 0 or 6 |

Bits:

When transmitted by an AP

FIG. 37

Example of Operating Channel Information

OCI element format

| Link ID | Operating Class | Primary Channel Number | Frequency Segment 1 Channel Number |
|---|---|---|---|
| 1 | 1 | 1 | 1 |

Octets:

FIG. 48

| Legacy OCI element/field | New element/field |
|---|---|
| OCI element | 9.4.2.XXX (ML-OCI element) |
| OCI KDE | 12.7.2(EAPOL-Key frames), ML-OCI KDE |
| OCI FTE subelement | 9.4.2.47 Fast BSS Transition element (FTE), ML-OCI subelement |

FIG. 49

OPERATING CHANNEL VALIDATION

PRIORITY CLAIM

This application claims priority to U.S. provisional patent application Ser. No. 63/214,096, entitled "Channel Switching and Operating Channel Validation", filed Jun. 23, 2021, each of which is hereby incorporated by reference in its entirety as though fully and completely set forth herein.

FIELD

The present application relates to wireless communications, including techniques for wireless communication among wireless stations and/or access points in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices", "user equipment", or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs may also couple to the Internet in a wired and/or wireless fashion. Wireless clients operating on an 802.11 network can be any of various devices such as laptops, tablet devices, smart phones, smart watches, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Some WLANs may utilize multi-link operation (MLO), e.g., using a plurality of channels (e.g., links) concurrently. APs and/or STAs capable of MLO may be referred to as multi-link devices (MLD). For example, APs capable of MLO may be referred to as AP-MLDs and STAs capable of MLO that are not acting as APs may be referred to as non-AP MLDs. Improvements in the field are desired.

SUMMARY

Embodiments described herein relate to systems, methods, apparatuses, and mechanisms for channel switching and channel validation by AP and non-AP MLDs.

A non-access point (AP) multi-link device (MLD) (non-AP MLD) may establish communication with an AP MLD on a first channel using a first affiliated AP of the AP MLD. To establish communication may comprise: performing a handshake with the AP MLD; receiving information for a second affiliated AP of the AP MLD; and validating the first affiliated AP. The non-AP MLD may validate the second affiliated AP of the AP MLD based on the information.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 10-39 illustrate aspects of channel switching, according to some embodiments.

FIGS. 41-49 illustrate aspects of validating multiple channels, according to some embodiments.

Figure 1:
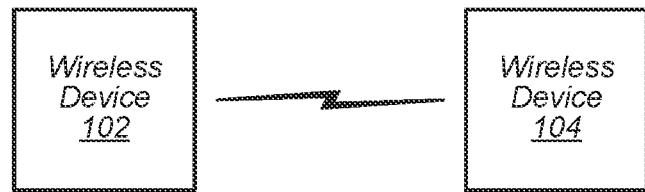
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
STA: Wireless Station
TX: Transmission/Transmit
RX: Reception/Receive
MLD: Multi-link Device
LAN: Local Area Network
WLAN: Wireless LAN
RAT: Radio Access Technology
ACK: Acknowledgment
BA: Block Acknowledgment
NACK: Negative Acknowledgment
N-BA: Negative Block Acknowledgment
TSF: Timing Synchronization Function
QoS: Quality of Service Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)— any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
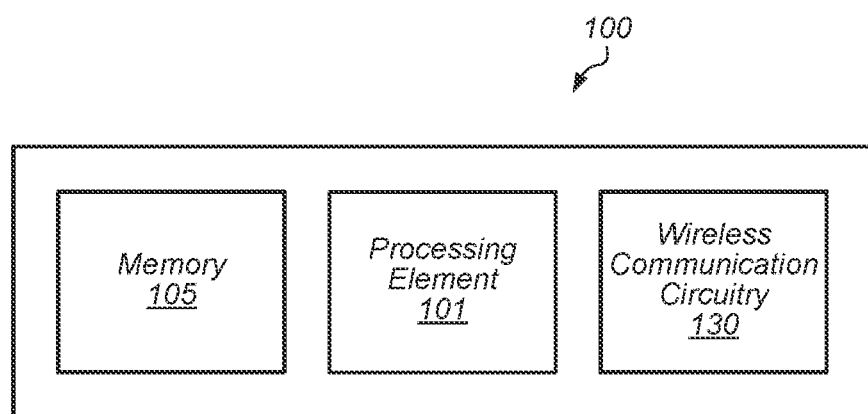
FIG. 2 illustrates an example simplified block diagram of a wireless device, according to some embodiments.

FIGS. 1-2—Wireless Communication System

FIG. 1 illustrates an exemplary (and simplified) wireless communication system in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, a wireless device (e.g., either of wireless devices 102 or 104) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 6:
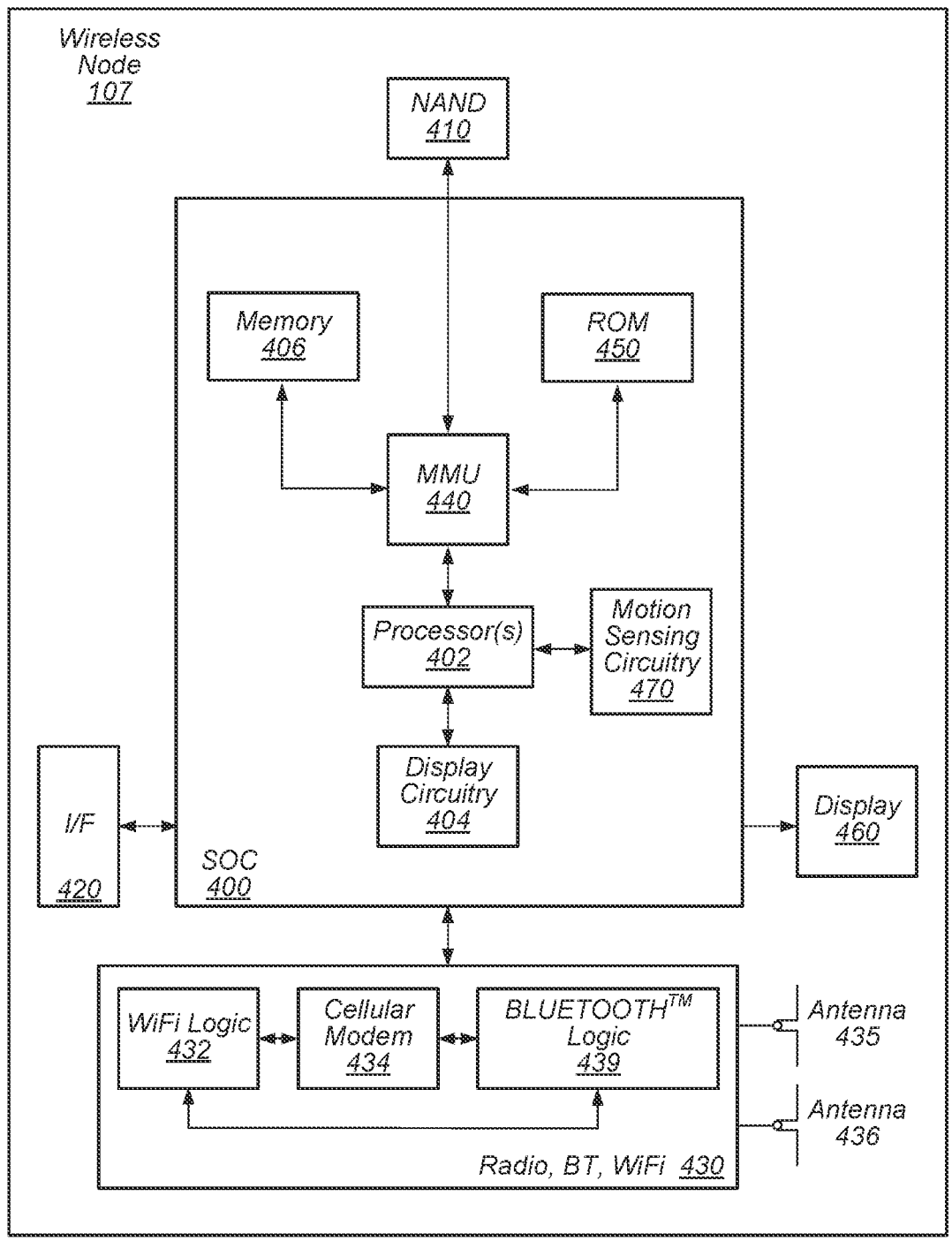
FIG. 6 illustrates an example simplified block diagram of a wireless node, according to some embodiments.

FIG. 6 illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 101. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna(s) for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

FIG. 3—WLAN System

Figure 3:
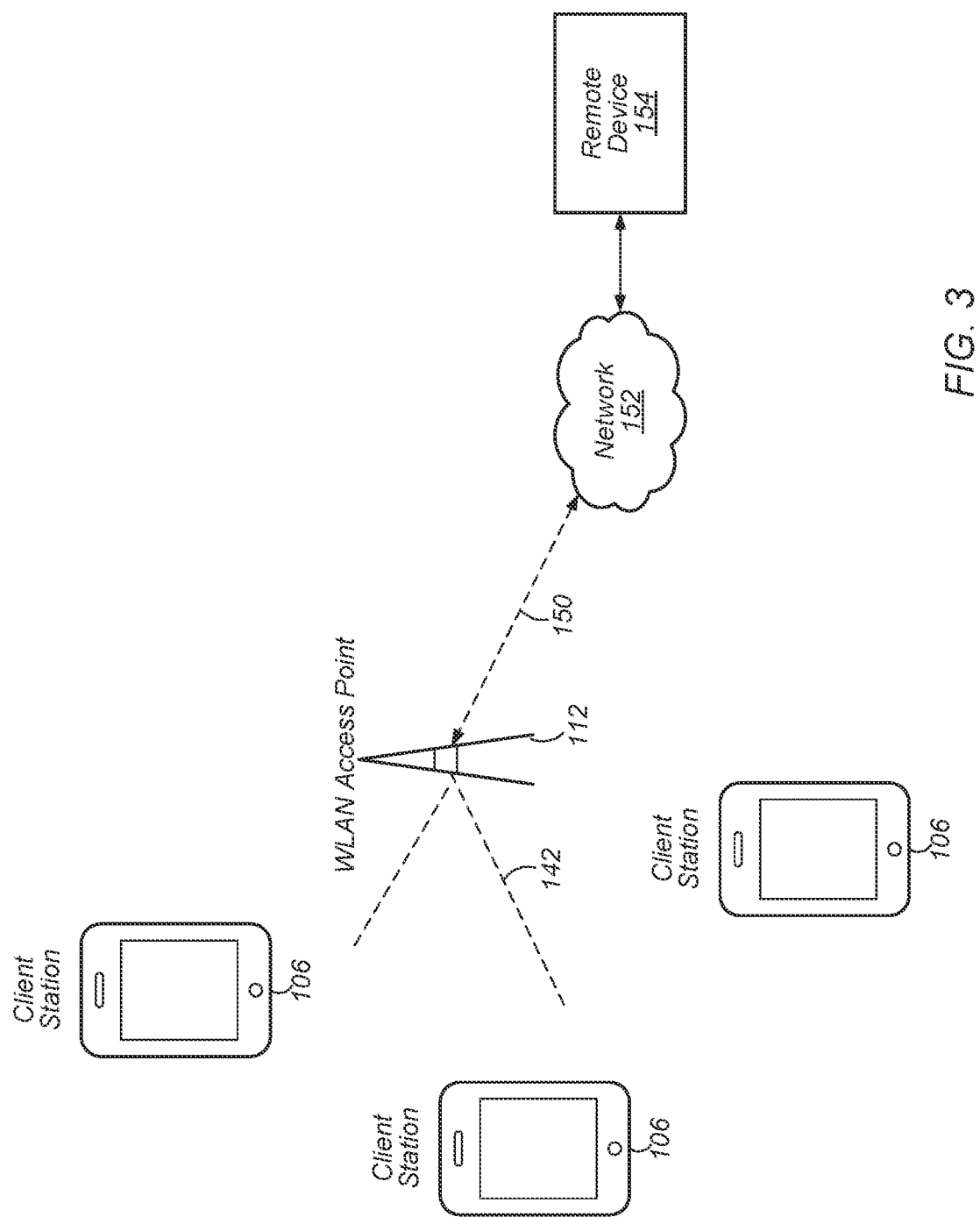
FIG. 3 illustrates an example WLAN communication system, according to some embodiments.

FIG. 3 illustrates an example WLAN system according to some embodiments. As shown, the exemplary WLAN system includes a plurality of wireless client stations or devices (e.g., STAs or user equipment (UEs)), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station, a server associated with an application executing on one of the STAs 106, etc. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, a wireless device 106 (which may be an exemplary implementation of device 100) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 4:
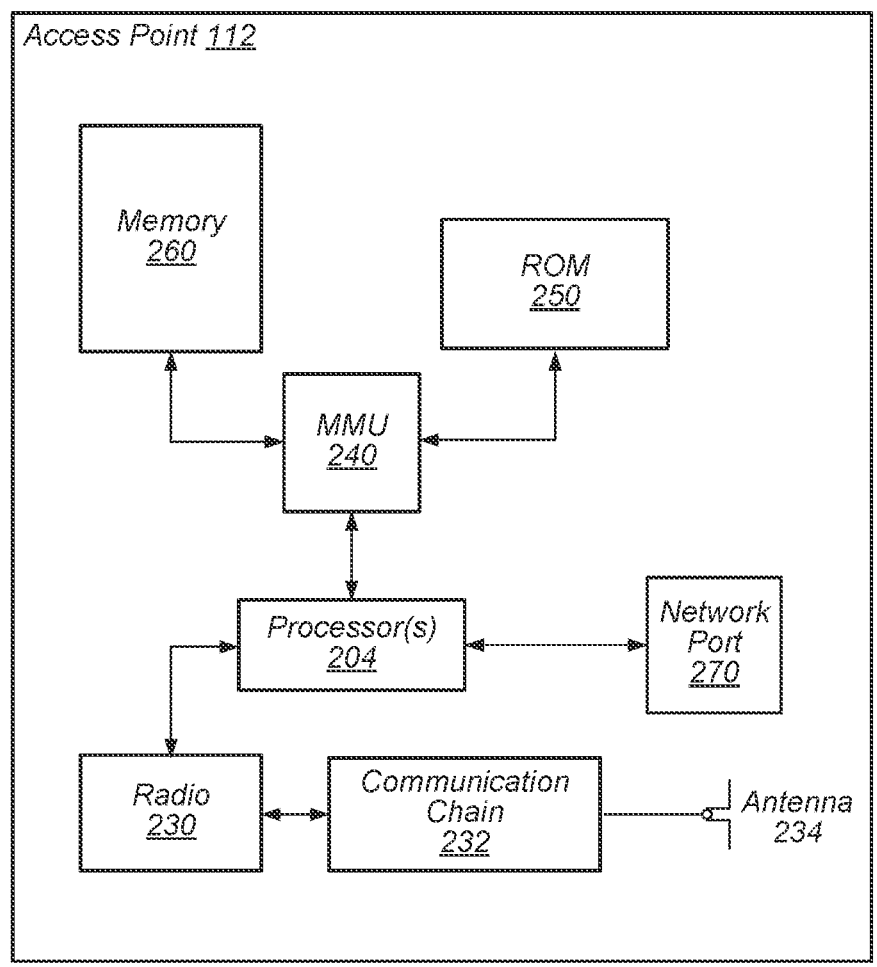
FIG. 4 illustrates an example simplified block diagram of a WLAN Access Point (AP), according to some embodiments.

FIG. 4—Access Point Block Diagram

FIG. 4 illustrates an exemplary block diagram of an access point (AP) 112, which may be one possible exemplary implementation of the device 100 illustrated in FIG. 4. It is noted that the block diagram of the AP of FIG. 4 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MLD.

Figure 5:
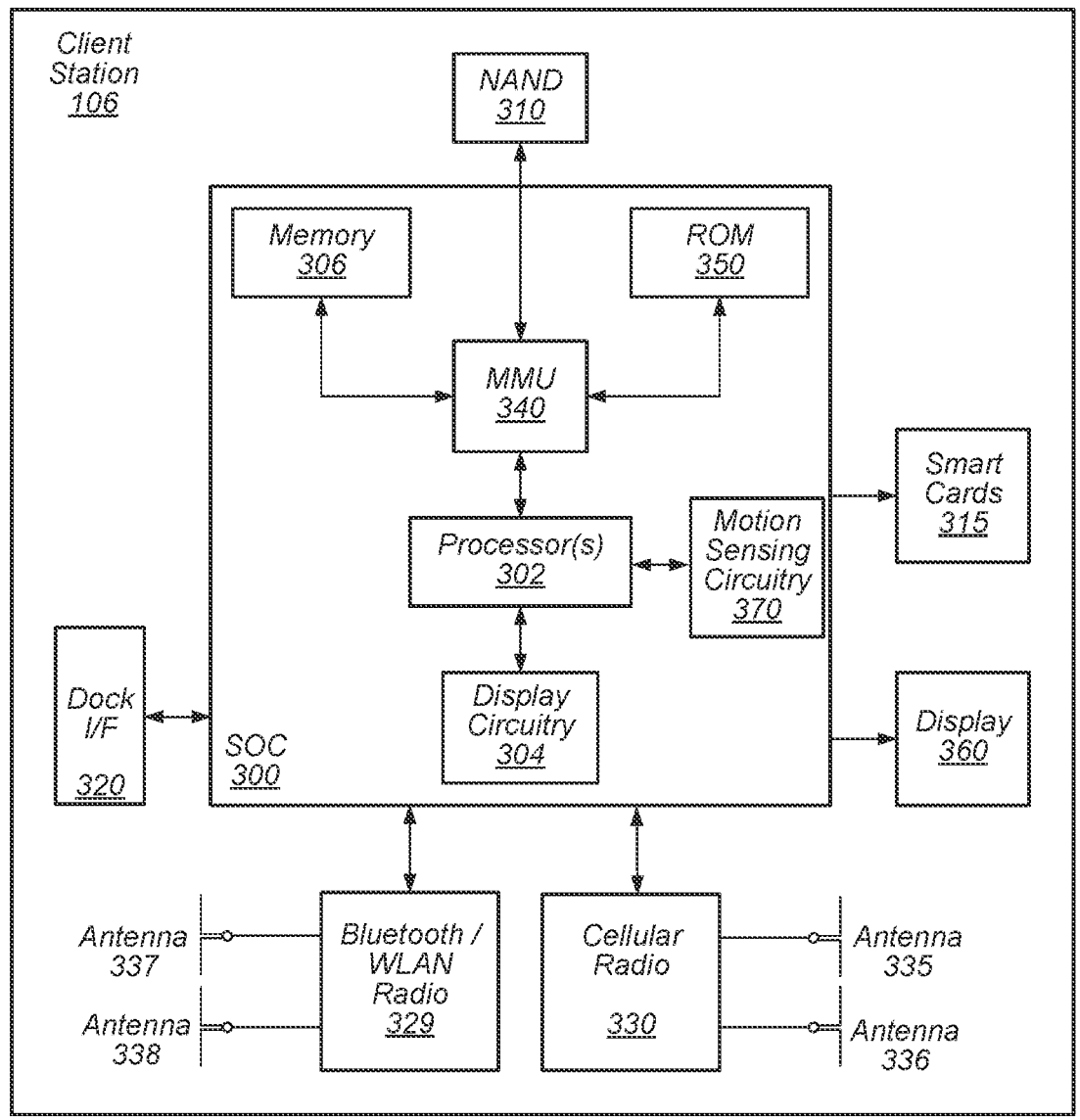
FIG. 5 illustrates an example simplified block diagram of a wireless station (STA), according to some embodiments.

FIG. 5—Client Station Block Diagram

FIG. 5 illustrates an example simplified block diagram of a client station 106, which may be one possible exemplary implementation of the device 100 illustrated in FIG. 4. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry (e.g., cellular radio) 330 such as for 5G NR, LTE, GSM, etc., and short to medium range wireless communication circuitry (e.g., Bluetooth™/WLAN radio) 329 (e.g., Bluetooth™ and WLAN circuitry). The client station 106 may further include one or more smart cards 315 that incorporate SIM (Subscriber Identity Module) functionality, such as one or more UICC(s) (Universal Integrated Circuit Card(s)). The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 3 or for ranging as shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 315, 320,329, 330, 335, 336, 337, 338, 340, 350, 360, 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

FIG. 6—Wireless Node Block Diagram

FIG. 6 illustrates one possible block diagram of a wireless node 107, which may be one possible exemplary implementation of the device 100 illustrated in FIG. 6. As shown, the wireless node 107 may include a system on chip (SOC) 400, which may include portions for various purposes. For example, as shown, the SOC 400 may include processor(s) 402 which may execute program instructions for the wireless node 107, and display circuitry 404 which may perform graphics processing and provide display signals to the display 460. The SOC 400 may also include motion sensing circuitry 470 which may detect motion of the wireless node 107, for example using a gyroscope, accelerometer, and/or any of various other motion sensing components. The processor(s) 402 may also be coupled to memory management unit (MMU) 440, which may be configured to receive addresses from the processor(s) 402 and translate those addresses to locations in memory (e.g., memory 406, read only memory (ROM) 450, flash memory 410). The MMU 440 may be configured to perform memory protection and page table translation or set up. In some embodiments, the MMU 440 may be included as a portion of the processor(s) 402.

As shown, the SOC 400 may be coupled to various other circuits of the wireless node 107. For example, the wireless node 107 may include various types of memory (e.g., including NAND flash 410), a connector interface 420 (e.g., for coupling to a computer system, dock, charging station, etc.), the display 460, and wireless communication circuitry 430 (e.g., for 5G NR, LTE, LTE-A, CDMA2000, Bluetooth, Wi-Fi, NFC, GPS, etc.).

The wireless node 107 may include at least one antenna, and in some embodiments, multiple antennas 435 and 436, for performing wireless communication with base stations and/or other devices. For example, the wireless node 107 may use antennas 435 and 436 to perform the wireless communication. As noted above, the wireless node 107 may in some embodiments be configured to communicate wirelessly using a plurality of wireless communication standards or radio access technologies (RATs).

The wireless communication circuitry 430 may include Wi-Fi Logic 432, a Cellular Modem 434, and Bluetooth Logic 439. The Wi-Fi Logic 432 is for enabling the wireless node 107 to perform Wi-Fi communications, e.g., on an 802.11 network. The Bluetooth Logic 439 is for enabling the wireless node 107 to perform Bluetooth communications. The cellular modem 434 may be capable of performing cellular communication according to one or more cellular communication technologies. Some or all components of the wireless communication circuitry 430 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 430 (e.g., Wi-Fi Logic 432) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 7:
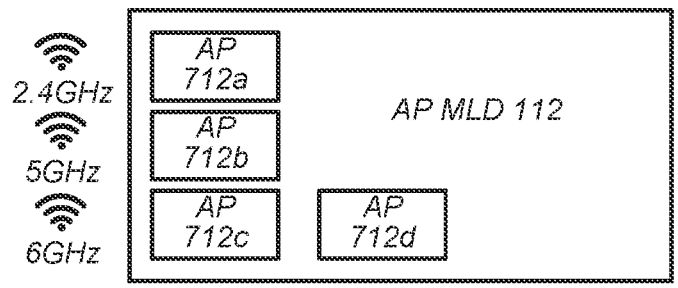
FIGS. 7-8 illustrates examples of MLDs, according to some embodiments.
Figure 8:
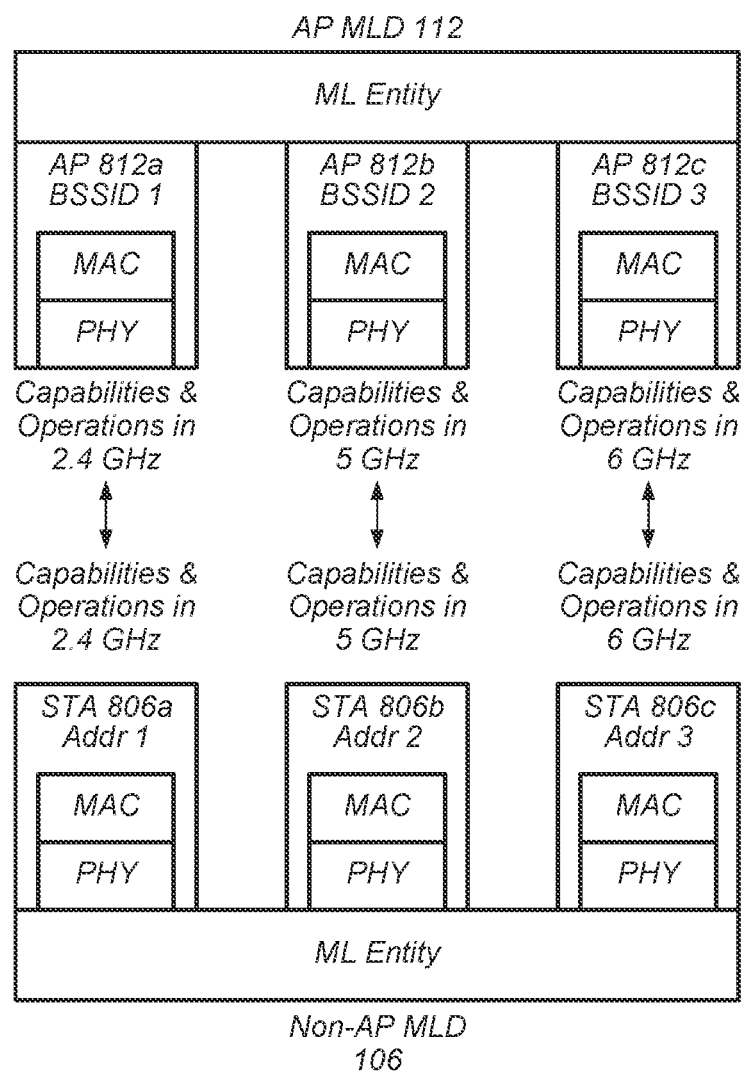

FIGS. 7-8—Multi-Link Device (MLD) Operation

IEEE 802.11be may include Multi-link Device (MLD) capabilities. In current implementations, an access point (AP) Multi Link Device (MLD) node may manage its affiliated APs. Thus, an AP MLD node may modify, add, and/or subtract affiliated APs to increase capacity, manage Basic Service Sets (BSSs) interference and coverage, including switching APs to operate in channels with least interference, and/or steer associated non-AP MLD nodes to operate on best performing APs and/or AP MLD nodes.

FIG. 7 illustrates an AP MLD 112, according to some embodiments. The AP MLD may operate any number of affiliated APs, e.g., APs 712a, 712b, 712c, and 712d in the illustrated example. The affiliated APs may operate on any of various frequency bands. Affiliated APs may operate on different frequency ranges (e.g., channels) of the same band, or on different frequency bands.

The AP MLD may provide the affiliated APs from a single physical device, e.g., a single shared housing and potentially using the same antenna(s). In some embodiments, the AP MLD may provide the APs from multiple distinct devices (e.g., a first device may provide one or more APs, a second device may provide a different one or more APs, etc.). In some embodiments, various affiliated APs may be separated spatially (e.g., beams in different directions, using different antennas with a shared housing (e.g., antennas of a same physical device), and/or of different devices, etc.).

In some embodiments, spatially separated affiliated APs may operate on a same (or overlapping) channel(s).

FIG. 8 illustrates an AP MLD 112 in communication with a non-AP MLD 106, according to some embodiments.

As shown, the AP MLD 112 may operate three affiliated APs. In the illustrated example, AP 812a may operate in a 2.4 GHz band, AP 812b may operate in a 5 GHz band, and AP 812c may operate in a 6 GHz band. It will be appreciated that any number of affiliated APs may be used in any combination of bands. For example, the AP MLD may operate multiple affiliated APs in one band and/or may not operate any affiliated APs in a band. The affiliated APs may include various layers, e.g., media access control (MAC) and/or physical (PHY) layers, among various possibilities. The affiliated APs may use different basic service sets (BSS) and/or different BSS identifiers (BSSID), e.g., BSSIDs 1-3.

As shown, the non-AP MLD 106 may operate three affiliated STAs, e.g., corresponding to the three affiliated APs. In the illustrated example, STA 806a may operate in the 2.4 GHz band, STA 806b may operate in a 5 GHz band, and STA 806c may operate in a 6 GHz band. The STAs may communicate with the corresponding APs. It will be appreciated that any number of affiliated STAs may be used in any combination of bands. For example, the non-AP MLD may operate multiple affiliated STAs in one band and/or may not operate any affiliated STAs in a band. The non-AP MLD may operate STAs corresponding to some, none, or all of the APs of the AP MLD. The affiliated STAs may include various layers, e.g., PHY and/or MAC layers, among various possibilities. The affiliated STAs may use different addresses, e.g., Addr 1-3 as shown.

The non-AP MLD may provide the affiliated STAs from a single physical device, e.g., a single shared housing and potentially using the same antenna(s). In some embodiments, the non-AP MLD may provide the STAs from multiple distinct devices (e.g., a first device may provide one or more STAs, a second device may provide a different one or more STAs, etc.). In some embodiments, various affiliated STAs may be separated spatially (e.g., beams in different directions, using different antennas with a shared housing (e.g., antennas of a same physical device), and/or of different devices, etc.).

The various affiliated STAs and APs may communicate concurrently/simultaneously. For example, STA 806a may exchange uplink and/or downlink data with AP 812a on a first link while STA 806b exchanges uplink and/or downlink data with AP 812b on a second link, etc. It will be appreciated that such concurrent communication may include (e.g., different) data being exchanged at the same time, overlapping times, and/or different times on different links. For example, data between the AP MLD and non-AP MLD may be routed over the first available link and/or a link selected based on other criteria (e.g., lowest energy use, etc.). For example, a first packet or portion of data may be sent over a first link and concurrently a second packet or portion of data may be sent over a second link.

In some embodiments, the AP MLD and non-AP MLD may include respective ML entities. An ML entity may provide upper MAC functionality that control the separate APs and/or STAs and may control traffic delivery through available links, e.g., between the various APs and STAs. The respective MLDs (e.g., AP and non-AP) may have only one respective MAC SAP interface. The MAC SAP interface may connect the MLD to the distribution system that may deliver traffic to/from the MLD from the internet. For example, as a result of having a single MAC SAP interface, all affiliated APs of an AP MLD may be visible as one device (e.g., the AP MLD) toward internet. The ML entity may manage this interface. The ML entity may manage transmission buffering (e.g., bookkeeping and link selection in the transmitter) and data re-order buffering in reception (e.g., combination of the data that is transmitted in different links).

The AP MLD 112 and non-AP MLD 106 may exchange information about their respective operations, operating parameters, and/or capabilities.

The non-AP MLD may have various capabilities for operating a STA in a particular band. The capabilities may be different for different bands. For example, the capabilities in a band may describe the maximum (e.g., fastest, most flexible, most powerful, highest throughput, etc.) parameter values that a STA of the non-AP MLD may use. Operations or operating parameters may describe the parameter values that are currently in use or planned to be in use at a future time.

For example, the parameters may include an applicable PHY version and its parameters. The parameters may describe supported services and transmission formats that are available. The parameters may also describe available resources, bandwidths and number of spatial streams. The parameters may describe power save support parameters which may enable low power transmissions. For instance, an AP may support Target Wake Time (TWT) power save.

In some embodiments, the links may be located so closely (e.g., spatially and/or in frequency), that a non-AP STA may not operate them independently (e.g., due to limits of the device and/or to manage resources or performance). APs may support STAs (e.g., non-AP MLDs) that are not capable to simultaneously transmit and receive on the link pair.

In some embodiments, the non-AP MLD may operate STAs communicating with multiple AP-MLDs. For example, a first STA may communicate with a first AP MLD and a second STA may communicate with a second AP MLD. Similarly, an AP MLD may communicate with multiple STAs. For example, one affiliated AP may communicate with multiple STAs.

In the illustrated example, the non-AP MLD operates a number of STAs equal to the number of APs provided by the AP MLD. However, different numbers are possible. For example, the AP MLD may provide more APs than the number of STAs operated by the non-AP MLD or vice versa. The number of APs and/or number of STAs may change over time.

Figure 9:
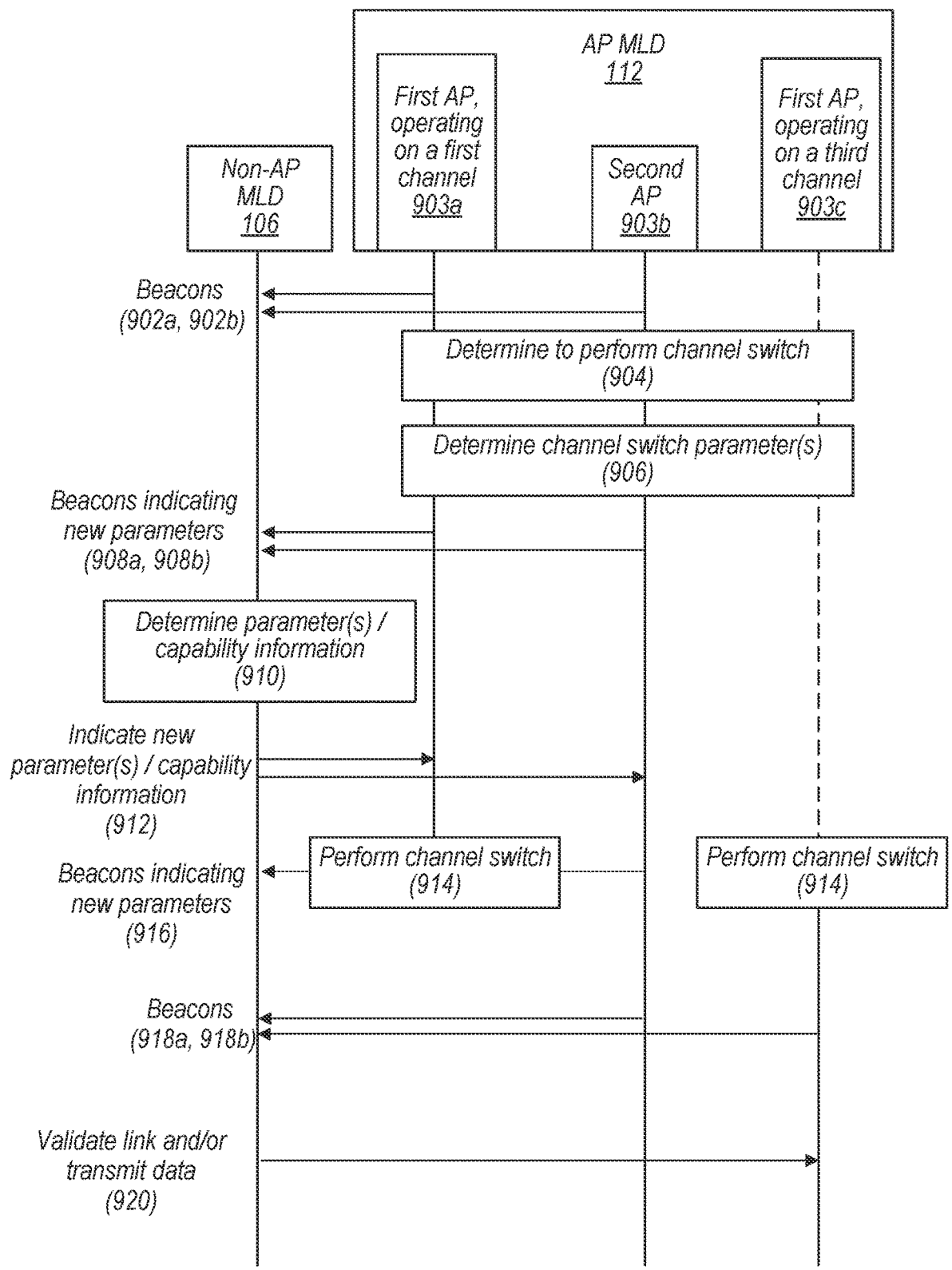
FIG. 9 illustrates an example method of channel switching by MLDs, according to some embodiments.

FIG. 9—Channel switching

In some embodiments, an AP MLD node may perform channel switching, e.g., changing/moving an affiliated AP from one channel to another. Such channel switching may be performed between channels of one band (e.g., 2.4 GHz, 5 GHz, or 6 GHz, etc.) or between bands (e.g., from a 5 GHz channel to a 6 GHz channel, etc.). For example, a channel switch may be a move of a first affiliated AP from a first channel on a first band to a second channel on the first band or on a different band. The first affiliated AP may operate on the first channel prior to the switch (e.g., without operating on the second channel at that time) and may operate on the second channel after the switch (e.g., without operating on the first channel at that time).

A non-AP MLD may perform similar channel switching, e.g., changing a STA from a first channel to a second channel. A non-AP MLD may switch channels for an affiliated STA in response to an AP MLD switching channels or indicating that it will switch channels. A non-AP MLD may request an AP MLD to perform a channel switch and an AP MLD may initiate a channel switch in response to such a request.

The AP MLD may signal (via the affiliated AP that will change channels and/or other affiliated APs) a channel switch. For example, the changing AP may signal the coming channel switch in one or more beacon that it transmits. Similarly, other affiliated APs may signal the switch, e.g., in a multi-link (ML) element of beacon frames they transmit. Such beacons may indicate the new channel and switch time (e.g., a point in time that the switch is scheduled to begin, e.g., when the AP may no longer provide the link on the first channel, additional information such as duration may also be included).

In some embodiments, Channel Switch and/or extended Channel Switch elements may be included in beacons from the switching AP and/or other affiliated APs. During the channel transition the channel switch duration may be added to beacons from affiliated APs. A quiet element may be added to beacons from affiliated APs. For example, the quiet element may indicate that the switching AP is currently switching, e.g., and thus may not be transmitting beacons and/or other frame and may not receive transmissions for a period of time.

In some embodiments, when an AP channel switch is signaled, the operating parameters of the switching AP (e.g., on the new channel) may be signaled only after channel switch is done. As a result, associated STAs may not prepare for operation with the new parameters until after the switch. Thus, until the new parameters are signaled, the associating/associated STAs may set their parameters according to parameters of the AP before switch.

In some embodiments, a channel switch as described below with respect to FIG. 9 may be faster than a channel switch as described above.

In the 6 GHz band, the regulatory power levels of the post-switch AP may need to be obtained before a STA may operate with the AP on the new channel. This may prevent or delay operation with AP, e.g., until the regulatory power level is determined by the AP MLD and the non-AP MLD. STAs may have low latency traffic ongoing with a switching AP. The channel switch delay may result in reduced quality of service (QoS) for any application(s) executing on the non-AP MLD. Further, STAs may not prepare for operation in the new channel. Getting the parameters before and/or during the switch may allow longer preparation time. This may reduce or avoid management traffic storms (e.g., multiple STAs trying to establish communication with the AP on the new channel in a similar time period), especially if the AP has large number of associated STAs. This may allow STAs to have more time to determine and indicate their new parameters.

Embodiments described herein provide systems, methods, and mechanisms for AP and non-AP MLD to perform channel switching. For example, according to embodiments of FIG. 9, parameters that will be in use by an AP after a channel switch may be signaled by that AP and/or other affiliated APs prior to the switch. Such a scheme may aid in reduced latency, reduced power consumption, and/or improved security. For example, FIG. 9 illustrates an example method of channel switching, according to some embodiments.

Aspects of the method of FIG. 9 may be implemented by AP MLD in communication with a non-AP MLD. The AP MLD and/or non-AP MLD may be as illustrated in and described with respect to various ones of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. For example, one or more processors (or processing elements) (e.g., processor(s) 101, 204, 302, 402, 432, 434, 439, baseband processor(s), processor(s) associated with communication circuitry such as 130, 230, 232, 329, 330, 430, etc., among various possibilities) may cause a wireless device, STA, UE, non-AP MLD, and/or AP MLD, or other device to perform such method elements.

Note that while at least some elements of the method of FIG. 9 are described in a manner relating to the use of communication techniques and/or features associated with IEEE and/or 802.11 (e.g., 802.11be) specification documents, such description is not intended to be limiting to the disclosure, and aspects of the method of FIG. 9 may be used in any suitable wireless communication system, as desired. Similarly, while elements of the method of FIG. 9 are described in a manner relating to AP and/or non-AP MLDs, such description is not intended to be limiting to the disclosure, and aspects of the method of FIG. 9 may be used by STAs (e.g., AP or non-AP) that are not MLDs, as desired.

The methods shown may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

An AP MLD 112 may transmit beacons (902a, 902b) from a first affiliated AP and a second affiliated AP, according to some embodiments. The first AP may operate on a first channel (903a) and the second AP may operate on a second channel (903b). The first and second channel may be in the same or different bands.

The beacons may include indications of various parameters of the corresponding AP. For example, beacons of the first AP may indicate parameters of the first AP. Such indicated parameters may include frequency, bandwidth, channel, basic service set identifier (BSSID), operating class, number of spatial streams (NSS), support for power save modes (e.g., such as TWT), beacon periodicity, EDCA parameters, MU EDCA parameters, Uplink Opportunistic Random Access (UORA) parameters (e.g., random access related parameters), capabilities for different PPDU types and/or transmission modes (e.g., extended range, optional MCSs), color value (e.g., to identify the AP in the new channel), etc. of the corresponding AP. It will be appreciated that parameters of different APs may be the same or may be different. For example, any or all parameter values may be the same (and/or may be different) for the first and second APs (or additional APs of the MLD AP).

Further, the beacons of one AP may include an indication of other APs. For example, beacons transmitted by the first AP may include an indication of the second AP (and/or any other/additional APs affiliated with the AP MLD) and vice versa. The beacons of one AP may include indications of parameters of the other APs. In some embodiments, beacons of one transmitting AP may include values for the same set of parameters for an affiliated AP as for the transmitting AP. In some embodiments, beacons of one transmitting AP may include values for fewer, different, and/or additional parameters of the affiliated AP.

A non-AP MLD 106 may receive the beacons. It will be appreciated that the non-AP MLD may include or operate multiple affiliated STAs corresponding to the affiliated APs of the AP MLD, e.g., as shown and described with respect to FIG. 8. Such affiliated STAs are illustrated as a single line in FIG. 9. The non-AP MLD may use the indication of parameters in the beacons to determine (e.g., set, reset, and/or adjust, etc.) any of its own parameters. For example, the parameter(s) of the first affiliated AP may be used to determine one or more parameter(s) of a corresponding affiliated STA, e.g., operating on the same channel as and in communication with the first affiliated AP.

The AP MLD may determine to perform a channel switch of one (or more) of the affiliated APs (904), according to some embodiments. For example, the AP MLD may determine to switch the first AP from the first channel (903a) to a third channel (903c). The third channel may be in the same or different band as the first channel (e.g., and/or the second channel).

The AP MLD may determine (e.g., new or revised) parameters of the first AP on the new channel (e.g., third channel 903c) (906), according to some embodiments. These parameters may be determined while the first AP operates on the first channel (e.g., 903a) Any or all parameters of the first AP may change in association with the channel switch. For example, a channel bandwidth and/or number of spatial streams (NSS) may or may not be changed, among various possibilities.

The following table illustrates changes in per-STA (e.g., per-AP) parameters according to the new and old band of the AP, according to some embodiments.

| New band of AP | Old band of AP | | |
| --- | --- | --- | --- |
| | From 2.4 GHz | From 5 GHz | From 6 GHz |
| To 2.4 GHz, 20 MHz BW, <4 NSS | No Per-STA parameter change | Likely Per-STA parameters are changed | Likely Per-STA parameters are changed |
| To 5 GHz, 80 MHz BW, 4-8 NSS | Likely Per-STA parameters are changed | No Per-STA parameter change | The Per-STA parameter(s) may be changed |
| To 6 GHz, 160 MHz BW, 8+ NSS | Likely Per-STA parameters are changed | The Per-STA parameter(s) may be changed | No Per-STA parameter change |

It will be appreciated that the above table is an example and that other embodiments may be used as desired. For example, per-STA parameters may or may not be changed in association with a channel switch that does not change the band of the AP (e.g., from 2.4 GHz to 2.4 GHz, etc.). Similarly, some or all per-STA parameters may not change in association with a channel switch that does change the band of the AP (e.g., from 2.4 GHz to 5 or 6 GHz, etc.).

It will be appreciated that the determination to perform the channel switch (e.g., 904) and the determination of parameters (e.g., 906) may occur simultaneously and/or in any order. These determinations may be based on any of various factors, which may be the same or different. For example, the AP MLD may determine to perform the channel switch and/or select parameters based on channel conditions, load levels, traffic patterns of the non-AP MLD (and/or any other non-AP MLD(s)), a request (e.g., in an association request, etc.) from the non-AP MLD (and/or any other non-AP MLD(s)), and/or other information. For example, the AP MLD may determine to perform the channel switch based on interference from another device. The AP MLD may determine to perform the channel switch based on parameters that it determines are appropriate to serve load and/or manage resources. The AP MLD may determine to perform the channel switch based on avoiding interference on a current channel (e.g., 903*a*) and select a new channel (e.g., 903*c*) with lower interference. The AP MLD may perform the channel switch in order to adjust an amount of resources used to match the throughput required. For example, the AP MLD may determine to perform the channel switch from a band (e.g., 2.4 GHz) which offers relatively low throughput to a band (e.g., 6 GHz) which offers higher throughput (e.g., due to larger channel bandwidth and/or higher NSS). The AP MLD may also receive information about capabilities of associated STA(s) to operate simultaneous transmit and receive capable link pairs, e.g., the associated STA may be capable to transmit on link 1 and receive on link 2 at the same time. If the non-AP MLD does not have this capability, then transmission in a link may cause so much interference that reception on another link (e.g., similar in frequency and/or spatially) may not be efficient, practical, etc. Based on the non-AP MLDs capabilities the AP MLD may decide to change AP to operate in other channels enabling independent operation for the links of the non-AP MLD. For example, the AP MLD may perform a channel switch to create sufficient separation between two links to allow simultaneous use of both channels for the non-AP MLD.

As another example, the parameters may signal the transmission power after the switch. For instance, on a 6 GHz band, in some areas, there may be a possibility to use location specific transmission power that is controlled by an automatic Frequency Controller server. In some cases, the AP may be operating in a moving device and the device may move to a location that allows the AP to operate using higher transmission power in the new band. The AP may switch to a new channel in order to be able to operate on higher power.

As another example, in 5 GHz radar detection channels, the AP may detect a radar and it may need to change to new channel.

As another example, in some situations, the AP may not maintain all its links due to poor coverage in the current band. The AP may switch to a lower frequency band in order to have better coverage with the associated STAs. If the AP is a mobile device, it may also take extended range PPDUs and modulations targeted for long range. These enhancements may boost AP coverage and may help to maintain all its links.

As another example, in some situation, the AP may have associated STAs that are at the edge of the coverage, but consume a lot of transmission resources. The AP may perform channel switch in order to lower the coverage of the BSS and stop serving these STAs to have more resources available for other associated STAs.

As another example, an AP MLD may be part of a larger network and when the network load increases, the AP MLD may switch one or more AP(s) to operating channel(s) and parameters that enable more dense deployment. Similarly, when the traffic load reduces, the deployment may return to original channels and parameters.

As another example, an AP MLD may have too much use on one AP and too little use on other APs. The AP MLD may use channel switching in various ways to rebalance the traffic loads between APs. The AP MLD may change the under used APs to new channels in order to get more traffic to them. The AP MLD may change the most used AP to other channel in order to divide the AP utilization more evenly.

As another example, a mobile device that operates as an AP may start to operate with other radio technology (e.g., with an additional or different RAT) and may reorganize the WLAN AP operating channel in order to avoid coexistence interference. In other words, an AP MLD may initiate a channel switch to reduce or avoid coexistence interference in the AP MLD with other communications on another RAT.

As another example, a mobile device that operates as an AP may transmit or plan to transmit D2D communication on other channel. In order to simplify two independent transmission operations, the mobile device may change the AP to operate on the same channel as D2D transmissions.

As noted above, a link pair may be located so close that transmission on link 1 and reception on link 2 may not be practical or possible, e.g., in view of limitations of some devices. Either or both of the AP and/or non-AP MLD may have these limitations. For example, a mobile device operates as AP may have such limitations. There are some capabilities and/or parameters describing how, if, or when operation in the link pairs is possible:

EMLSR (enhanced multilink single radio) may assume initiation frame transmission after which the DL data transmission or UL triggering may be done for the STA in the link. The other link may not transmit anything to the STA for the duration of the TXOP initiated by the initiation frame.

Non-Simultaneous transmit Receive (NSTR) may be a general mode where data may be transmitted directly (no initiation frames) to the STA, but when STA transmits on link 1, then AP may not transmit to the STA on the link 2.

The determination to perform the switch and/or the determination of parameters may be referred to as the beginning of a "grace period". For example, the grace period may last until the first AP begins to perform the channel switch, e.g., thus becoming temporarily unavailable.

The AP MLD may transmit one or more beacon(s) via the first and second affiliated APs (908*a*, 908*b*), according to some embodiments. Beacons transmitted by the first AP may be transmitted on the first channel (903*a*) and beacons transmitted by the second AP may be transmitted on the second channel (903*b*).

The beacons may indicate information about the (e.g., planned, upcoming, and/or ongoing) channel switch. For example, the beacons may indicate the time of the channel switch, e.g., a start time, end time, and/or duration. Similarly, the beacon(s) may indicate the parameter(s) of the first AP, e.g., that will be used after the channel switch (e.g., as determined in 906). Additionally, the beacon(s) may indicate parameters of the first AP on the first channel (903*a*), the second AP, and/or any other affiliated APs.

It will be appreciated that such beacons may be transmitted periodically. For example, the first and/or second APs may transmit any number of beacons during the grace period. For example, the beacons may be transmitted at periodic intervals.

Moreover, the second AP may continue transmitting one or more beacon(s) (916) during the channel switch (e.g., discussed below with reference to 914). It will be appreciated that the information indicated by the beacons of the second AP may change when the channel switch begins. For example, prior to the beginning of the channel switch, beacons of the second AP may indicate operating parameters of the first AP prior to the switch and after the switch (e.g., parameters for both time periods may be transmitted in the beacon(s)). However, once the switch begins, the beacons of the second AP may no longer indicate parameters of the first AP from prior to the switch. In some embodiments, beacons of the second AP may indicate further detail of the parameters once the switch begins and/or as the time of the switch comes closer.

In the event that the first AP is not changing parameters in association with the channel switch (e.g., the first AP is to use the same parameter values in the new channel 903c as in the old channel 903a), then the beacons may indicate that there is no change. For example, a channel switch element and/or extended channel switch element may have a field set to 1 to indicate that AP parameters are the same in the new channel. In some embodiments, AP capabilities and operation parameters may be signaled by different band specific elements.

In the event that the first AP is changing parameters in association with the channel switch (e.g., the first AP is to use one or more changed parameter values in the new channel 903c relative to the old channel 903a), then the beacons may indicate that there is a change. For example, affiliated APs may transmit a ML reconfigure variant multi-link element in the beacon(s) and/or any ML probe responses. The ML reconfigure variant multi-link element may contain a per-STA profile of the switching AP containing the parameter values in the new channel. Further, the ML reconfigure variant multi-link element may contain a field (or fields) for multi-link parameters signaling the AP MLD simultaneous transmission support or lack thereof (e.g., STR/NSTR) after the channel switch.

In some embodiments, instead of and/or in addition to transmitting beacons indicating the new parameters, the AP MLD may transmit similar information in probe responses. For example, the non-AP MLD may transmit a probe request to the AP MLD (e.g., via the first and/or second AP). In response to the probe request, the AP MLD may transmit a probe response including information about the channel switch, e.g., including timing of the switch and/or parameters that the first AP will use on the third channel 903c.

The non-AP MLD may receive the beacon(s) and/or probe response(s) from the first and/or second AP. The non-AP MLD may decode the parameters and/or other information indicated by the beacon(s).

The non-AP MLD may determine capability information and/or one or more operating parameter(s) (910), according to some embodiments. The capability information and/or parameter(s) may be based on the parameter(s) for the first AP in the new channel (e.g., 903c). For example, in response to a channel switch that includes a band change, the non-AP MLD may determine its capabilities (e.g., maximum bandwidth, NSS, etc.) in the band (e.g., of the new channel). Further, the non-AP MLD may determine the particular parameter(s) that it will use with the first AP in the new channel. For example, in response to any indication(s) that the first AP will use parameters that allow higher throughput (e.g., greater bandwidth, higher NSS, etc.), the non-AP MLD may determine whether or not it will increase its own corresponding parameter values (e.g., greater bandwidth, higher NSS, etc.). The parameter(s) may be based on information including traffic patterns, applications executing on the non-AP MLD, battery level of the non-AP MLD, user preferences, parameters of other APs, etc., e.g., in addition to or instead of the parameter(s) for the first AP, e.g., as indicated in the beacons. For example, the non-AP MLD may determine parameters in response to parameters of the AP, e.g., as indicated to be in effect after the channel switch.

In some embodiments, a non-AP MLD may select and/or modify operation of one or more other/additional RAT based on the coming AP channel switch. For example, based on the channel switch (e.g., and/or the new parameters for the first AP in the new channel), the non-AP MLD may activate an additional RAT, deactivate an active RAT, modify a parameter of another RAT, etc. As one possibility, the non-AP MLD may determine that the channel switch may allow an additional RAT to operate, e.g., with coexistence interference below a threshold. For example, based on the new channel, the non-AP MLD may determine that activating a Bluetooth link may be viable (e.g., because the new channel 903c may interfere with Bluetooth less than the old channel 903a) and may therefore activate or increase use of a Bluetooth link. Conversely, the non-AP MLD may deactivate or reduce use of a link (e.g., in the reverse scenario where the new channel leads to increased potential for interference with the link). Further, the non-AP MLD may attempt to modify the frequency range(s) used by an alternative link, e.g., to increasingly use bandwidth near the first channel 903a and avoid bandwidth near the new channel 903c.

In some embodiments, a non-AP MLD may start to operate, stop, or modify D2D transmissions based on the coming AP channel switch. For example, similar to the previous examples, based on a determination that D2D communications may be effective on the first channel 903a, the non-AP MLD may begin to operate such D2D communications.

The non-AP MLD may indicate, to the AP MLD, the capability information and/or one or more operating parameter(s) (912), according to some embodiments. For example, the non-AP MLD may transmit a message to the AP MLD (e.g., via the first and/or second AP) including an indication of any of the capability information and/or parameter(s) determined in 910, among various possibilities.

As shown, this indication may be transmitted as an indication to the first AP on the first channel and/or to the second AP on the second channel, e.g., prior to the channel switch. In some embodiments, the indication may be transmitted to the second AP during and/or after the channel switch. In some embodiments, the indication may be transmitted to the first AP after the channel switch is complete, e.g., on the third channel. These embodiments may be combined in various manners. In other words, the non-AP MLD may transmit the indication to the first and/or second AP prior to the switch, to the second AP during the switch, and/or to the first and/or second AP after the switch. For example, such an indication may be sent to the first and/or second AP prior to the channel switch (e.g., via channels 903a and/or 903b, respectively), to the second AP during the channel switch, and/or to the first and/or second AP after the channel switch (e.g., via channels 903c and/or 903b, respectively).

The AP MLD may perform the channel switch, e.g., the first affiliated AP may perform the channel switch from first channel 903a to third channel 903c (914), according to some embodiments. The first affiliated AP may discontinue use of some or all parameters associated with the first channel and may begin to use the parameters associated with the third channel (e.g., as determined in 906).

The channel switch may occur over a period of time (e.g., as may be indicated by the beacon(s) discussed in 908a, 908b). The first AP may not be available during this period.

For example, the first AP may not send beacons, transmit data/messages, or receive data/messages during this time.

However, other affiliated APs of the AP MLD may continue operating during this period of time. For example, the second AP may transmit one or more beacon(s) or probe responses. Such beacon(s) and/or probe responses may indicate that the channel switch is ongoing, the time that the channel switch will be complete, parameters of the second AP, and/or parameters of the first AP for the third channel 903c.

Similarly, the non-AP MLD may continue operating during this period. For example, the non-AP MLD may exchange data with the second AP and/or send probes and receive probe responses.

Further, the non-AP MLD may update its parameters (e.g., as determined in 910) to prepare for operation with the first AP on the third channel, e.g., after completion of the channel switch. For example, the non-AP MLD (e.g., or an affiliated STA that will communicate with the first AP on the third channel) may activate or deactivate any antennas or other communication circuitry according to any changed parameters. Similarly, the non-AP MLD (e.g., affiliated STA) may adjust any band filters for the new channel, etc.

The AP MLD may transmit beacon(s) after the channel switch (918a, 918b), according to some embodiments. The beacons may describe the current (e.g., post-switch) operating parameters of the first AP (e.g., on channel 903c) and/or the second AP. The beacon(s) 918a and 918b may be transmitted by the first and/or second AP on the third and/or second channels, respectively. Beacons transmitted by the APs may be different, e.g., as described above with respect to 902a, 902b.

The non-AP MLD may validate a link with the first AP on the new channel (920), according to some embodiments. For example, the non-AP MLD may validate the link based on receiving the beacon(s) (e.g., 918a) from the first AP on channel 903c. The link may be validated by the non-AP MLD transmitting uplink data to the AP MLD (e.g., to the first AP on channel 903c). In some embodiments, after such uplink data is exchanged, both the AP MLD and the non-AP MLD may consider the link validated.

The non-AP MLD and AP MLD may exchange uplink and/or downlink data via the first and/or second AP.

In some embodiments, no second AP (e.g., operating on second channel 903b) may be provided by the AP MLD. Thus, the method of FIG. 9 may apply to an AP MLD operating only a single AP (e.g., for a relevant period of time). Actions discussed above associated with such a second AP may be omitted and/or may be performed by the first AP.

In some embodiments, multiple second APs (e.g., operating on other/additional channels) may be provided by the AP MLD. Thus, the method of FIG. 9 may apply to an AP MLD operating only any number of second APs (e.g., for a relevant period of time). Actions discussed above associated with such a second AP may be performed by none, some, or all of such second APs.

FIGS. 10-39 and Additional Information Regarding Channel Switching

Figures 10, 11, 12, 13:
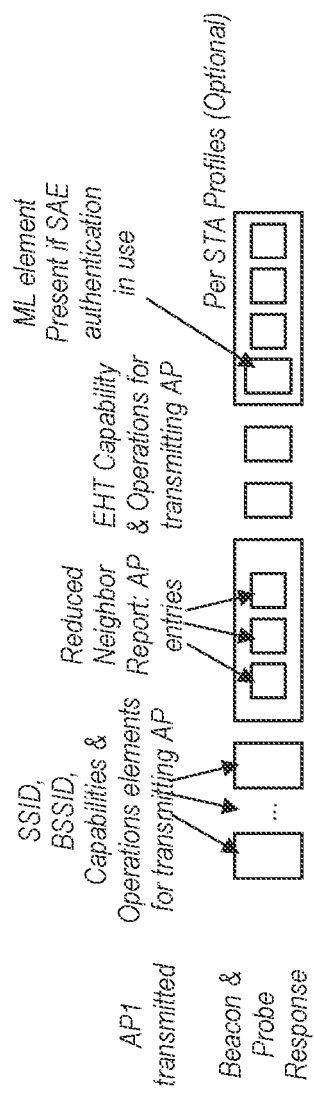

FIG. 10 illustrates a message that may be transmitted by an AP (e.g., any of 712a-712d, etc.), according to some embodiments. Further details are included in FIGS. 11-25. The message may be transmitted as a beacon and/or probe response (e.g., as discussed with respect to 902, 908, 916, and/or 918 with respect to FIG. 9). The message may include information about the AP and/or other affiliate APs of an AP MLD 112.

It will be appreciated that the illustrated structure of the message as illustrated in FIGS. 10-25 is an example and that other structures and/or combinations of elements may be used as desired. For example, some elements may be omitted, others may be added, and/or a different order may be used. Various fields may also include subfields or bits that are reserved for future use.

As shown, the message may include identifying information about the AP (e.g., service set identifier (SSID), BSSID, etc.). The message may include elements describing the capability and operations (e.g., operating parameters) of the AP. For example, the message may describe frame structures used by the AP. The message may include a reduced neighbor report (RNR) element which may include entries for other affiliated APs of the AP MLD 112 (e.g., for a message transmitted by AP 712a, there may be entries for APs 712b, c, and/or d). An RNR element may be as further described below with respect to FIG. 11. The message may include elements describing the high throughput (HT) (e.g., extremely high throughput (EHT), etc.) capabilities, operations, and/or parameters of the AP.

The message may include a multi-link (ML) element, e.g., as further described below with respect to FIG. 17. In some embodiments, the ML element may only be used if simultaneous authentication of equals (SAE) is in use. In some embodiments, the ML element may be included if SAE is not used. The ML element may include information (e.g., parameters, capabilities, etc.) that is common to all affiliated APs of the AP MLD. The ML element may also include per STA information, e.g., a profile of individual affiliated APs.

Figures 27, 28, 29:
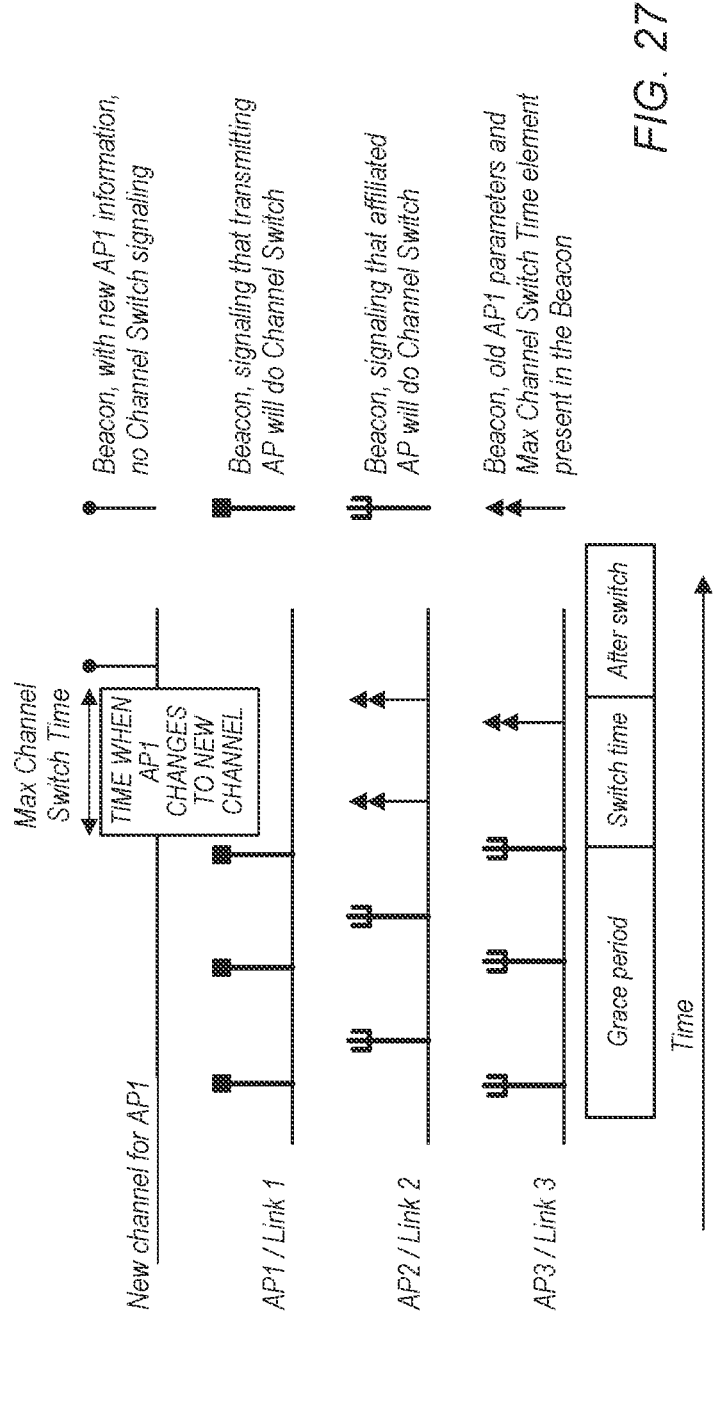

In some embodiments, the message may include an indication of the timing of a channel switch, e.g., as further described with respect to FIGS. 28-29.

The following table describes some elements of the message of FIG. 10, according to some embodiments.

| Information element type | Described AP(s) | Format |
| --- | --- | --- |
| Frame body capability/ operations elements | Information of the transmitting AP | Complete set of the transmitting AP link specific capabilities and operations elements |
| Reduced Neighbor Report (RNR) element | Information of co-located/ affiliated APs (e.g., APs in the same AP MLD) and optionally on neighbor AP MLD(s) | Very short format. Only operating channel, BSSID, SSID, target beacon transmission time (TBTT), etc. |
| Multi-Link element: Common parameters | ML level information, e.g., common information for all APs in AP MLD | Contains parameters for APs in AP MLD and/or Multi-link level parameters (e.g., simultaneous |

-continued

| Information element type | Described AP(s) | Format |
| --- | --- | --- |
| Multi-Link element: Per-STA parameters | Link specific information of other affiliated AP in the AP MLD | transmit/receive capabilities, e.g., NSTR/STR) Elements describing specific APs, e.g., similar to information included in a beacon describing the transmitting AP |

In the above table, "frame body" refers to normal fields in the frame. For example, a frame may contain multiple elements as defined in 802.11 or another wireless standard.

FIG. 11 illustrates a RNR element, according to some embodiments. As shown, the RNR element may include an element identifier, a length field, and any number of neighbor AP information fields, e.g., discussed with respect to FIG. 12. For example, the RNR element may include respective neighbor information fields for respective other affiliated APs of an AP MLD. For example, a message transmitted by AP 712a may include an RNR element with neighbor AP information fields for APs 712b-d.

FIG. 12 illustrates a neighbor AP information field, according to some embodiments. The neighbor AP information field may include subfields for different information about a corresponding neighbor AP. As shown, the neighbor AP information field may include a TBTT information header field, e.g., indicating timing information of beacons transmitted by the corresponding neighbor AP as further described with respect to FIG. 15. The neighbor AP information field may include operating class information and a channel number for the corresponding neighbor AP. The operating class and channel number may indicate the channel in which the AP operates. The neighbor AP information field may include a TBTT information set, including any number of TBTT information fields as further described with respect to FIG. 13. For example, an RNR may describe a band and channel first and then include a TBTT information field for an AP in this channel.

FIG. 13 illustrates a TBTT information field, according to some embodiments. The TBTT information field may include an indication of a TBTT offset of the corresponding neighbor AP, e.g., relative to the transmitting AP. The TBTT information field may include an indication of the BSSID and/or short SSID of the corresponding neighbor AP. The TBTT information field may include an indication of the BSS parameters of the corresponding neighbor AP, e.g., fields as further described with respect to FIG. 14. The TBTT information field may include an indication of 20 MHz power spectral density (PSD) of the corresponding neighbor AP. The TBTT information field may include an indication of MLD parameters of the corresponding neighbor AP, e.g., as further discussed with respect to FIG. 16.

FIG. 14 illustrates a BSS parameters field, according to some embodiments. The BSS parameters field may include an indication of whether on channel tunneling (OCT) is recommended, e.g., whether a STA may tunnel management frames through one AP to another. The BSS parameters may indicate whether the same SSID is used by the corresponding neighbor AP as the transmitting AP and/or may indicate the SSID of the corresponding neighbor AP. The BSS parameters may indicate one or multiple BSSID(s) of the corresponding neighbor AP. The BSS parameters may indicate a transmitted BSSID of the corresponding neighbor AP, e.g., a BSSID that the corresponding neighbor AP uses to transmit beacons. The BSS parameters may indicate whether the corresponding neighbor AP is a member of an extend service set (ESS). The ESS indication may further indicate whether the AP is a member of an ESS with co-located or non-collocated APs in 2.4 and/or 5 GHz bands. The BSS parameters may indicate whether the corresponding neighbor AP actively responds to unsolicited probe responses. The BSS parameters may whether the corresponding neighbor AP is collocated with the transmitting AP.

FIG. 15 illustrates a TBTT information header, according to some embodiments. The TBTT information header may include an indication of a TBTT information field type. In some embodiments, a number of indications may correspond to the number of TBTT information fields included in the neighbor AP information field. In some embodiments, a single indication of TBTT information field type may apply to all included TBTT information fields. The TBTT information header may include an indication of whether the corresponding neighbor AP is filtered. The TBTT information header may include an indication of the number of TBTT information fields. The TBTT information header may include an indication of the length of the TBTT information fields (e.g., individually or as a group).

FIG. 16 illustrates a MLD parameters field, according to some embodiments. The MLD parameters field may include an indication of a MLD ID of the corresponding AP MLD. For example, a single physical device may include multiple AP MLDs, e.g., and each AP MLD may include multiple APs. The MLD ID may identify the corresponding AP MLD relative to a list of AP MLDs. The link ID may indicate the link identifier of the corresponding AP within the AP MLD to which the transmitting AP is affiliated. In other words, MLD ID may describe one of multiple AP MLDs and link ID may describe one AP of a particular AP MLD. For example, in the case that the transmitting AP is 712a and the corresponding AP is 712b, the MLD ID may indicate that both APs are of the same AP MLD. The link ID may indicate that the corresponding AP is the first of three other APs of the AP MLD (e.g., 712b-d).

The MLD parameters field may include an indication of a change sequence, e.g., a version ID. The change sequence may be incremented when a (e.g., significant) change in the beacon for the corresponding AP occurs. For example, the change sequence field may be incremented when a channel switch is announced (e.g., in 908) and/or when the channel switch is complete (e.g., in 918), among various possibilities.

FIG. 17 illustrates a ML element, according to some embodiments. As summarized in the following table, a ML element may be in any of various variant forms, e.g., basic, probe request, or reconfiguration.

| Multi-link element variant/type | Use in different frames |
|---|---|
| Basic variant | When present in a beacon or probe response frame, may contain common parameters and may not contain Per-STA parameters. When used in Association Requests and Association Response frames, may contain common parameters and complete set of per-STA parameters, e.g., describing the affiliated AP. |
| Probe Request variant | May be used in a Probe Request to signal for which link(s) parameters are requested and whether request is partial or complete, e.g., whether all parameters are requested for the indicated link(s) or only an (e.g., identified) subset of the parameters are requested. |
| Reconfiguration variant | May be used to indicate a reconfiguration, e.g., such as a channel switch. May be included in a ML reconfiguration request and/or response. May communicate the addition and/or deletion of a link. May contain common parameters, an indication of a link ID that is deleted, and/or a complete set of Per-STA Profile Parameters for AP/STA that is added. |

The ML element may include an element identifier, length indication, and element ID extension. In the illustrated example, the element identifier may be 255, e.g., indicating that an extended ID may be present. The ML element may include a ML control field (e.g., further described with respect to FIG. 18). The ML element may include common information for all links (e.g., APs) (e.g., further described with respect to FIG. 19) and link information for specific links (e.g., APs). For example, the link-specific information may include per-STA profiles. Further, vendor specific information may be included.

The ML element may further include an indication of a (e.g., upcoming) channel switch by the transmitting AP and/or an affiliated AP. The indication may indicate which AP is changing channels and/or whether parameters of the channel-changing AP will change.

It will be appreciated that the ML element may be transmitted by the AP MLD or non-AP MLD. For example, an AP MLD may include an ML element in a beacon or probe request response, e.g., as discussed with respect to 902, 908, 916, and/or 918 with respect to FIG. 9. A non-AP MLD may transmit an ML element that indicates its capabilities and/or parameters as discussed with respect to 912.

FIG. 18 illustrates an example multi-link control field, according to some embodiments. The ML control field may indicate a type of the ML element (e.g., basic, probe request, or reconfiguration, as discussed above; see also FIG. 34). The ML control field may include 1 bit indicators indicating: whether an MLD MAC address is present, whether link identification information is present, whether BSS parameters change count is present, whether medium synchronization delay information is present, whether enhanced ML (EML) capabilities are present, and whether MLD capabilities are present.

FIG. 19 illustrates an example common information field according to some embodiments. The common information field may include a MAC address for the AP MLD. The common information field may include information for all link IDs. The common information field may include parameters or information for all links. For example, transmission power delta may be included. The common information field may include an indication of the BSS parameters change count. The common information field may include medium synchronization delay information (see FIG. 20). The common information field may include EML capabilities (see FIG. 21). The common information field may include MLD capabilities (see FIG. 22).

FIG. 20 illustrates an example medium synchronization delay information field according to some embodiments.

FIG. 21 illustrates an example EML capabilities field according to some embodiments.

FIG. 22 illustrates an example MLD capabilities field according to some embodiments. The MLD capabilities field may indicate a maximum number of links supported simultaneously by the transmitting MLD (e.g., AP or non-AP MLD).

FIG. 23 illustrates a ML element similar to FIG. 17, according to some embodiments. FIG. 23 highlights a first per-STA profile (e.g., Profile x). A per-STA profile is described further with respect to FIG. 24.

FIG. 24 illustrates a per-STA profile, according to some embodiments. The per-STA profile may include a subelement ID, a length indicator, a STA control field (further described with respect to FIG. 25). The per-STA profile may include STA information, including a MAC address, beacon interval, Delivery Traffic Indication Message (DTIM) count, DTIM, period, NSTR bitmap, etc. Affiliated APs may have individual beacon interval and DTIM periodicity. In some embodiments, a beacon period may change in association with a channel switch. Thus, this field may indicate a new beacon period for an upcoming channel switch. In some embodiments, in absence of an indication of a new interval, a non-AP may perform passive scanning, e.g., assuming a 100 ms interval between beacons or may assume the beacon interval is unchanged. NSTR bitmap value of 1 may indicates that the reported Link and other link operate in NSTR mode. When present, the Per-STA Profile may contain NSTR information for all link pairs. The per-STA profile may include a STA profile, including capability information specific to the STA.

FIG. 25 illustrates a STA control field, according to some embodiments. The STA control field may include a link ID. The respective affiliate APs of an AP MLD may have unique link IDs. The link ID may be constant (e.g., may not change) during the AP MLD lifetime. The STA control field may include indications of whether the STA profile is complete and whether a MAC address is present. The STA control field may include an indication of whether a beacon interval is present and an indication of whether DTIM information is present. The STA control field may include indications of whether NSTR link pair and/or NSTR bitmap is present.

Figure 26:
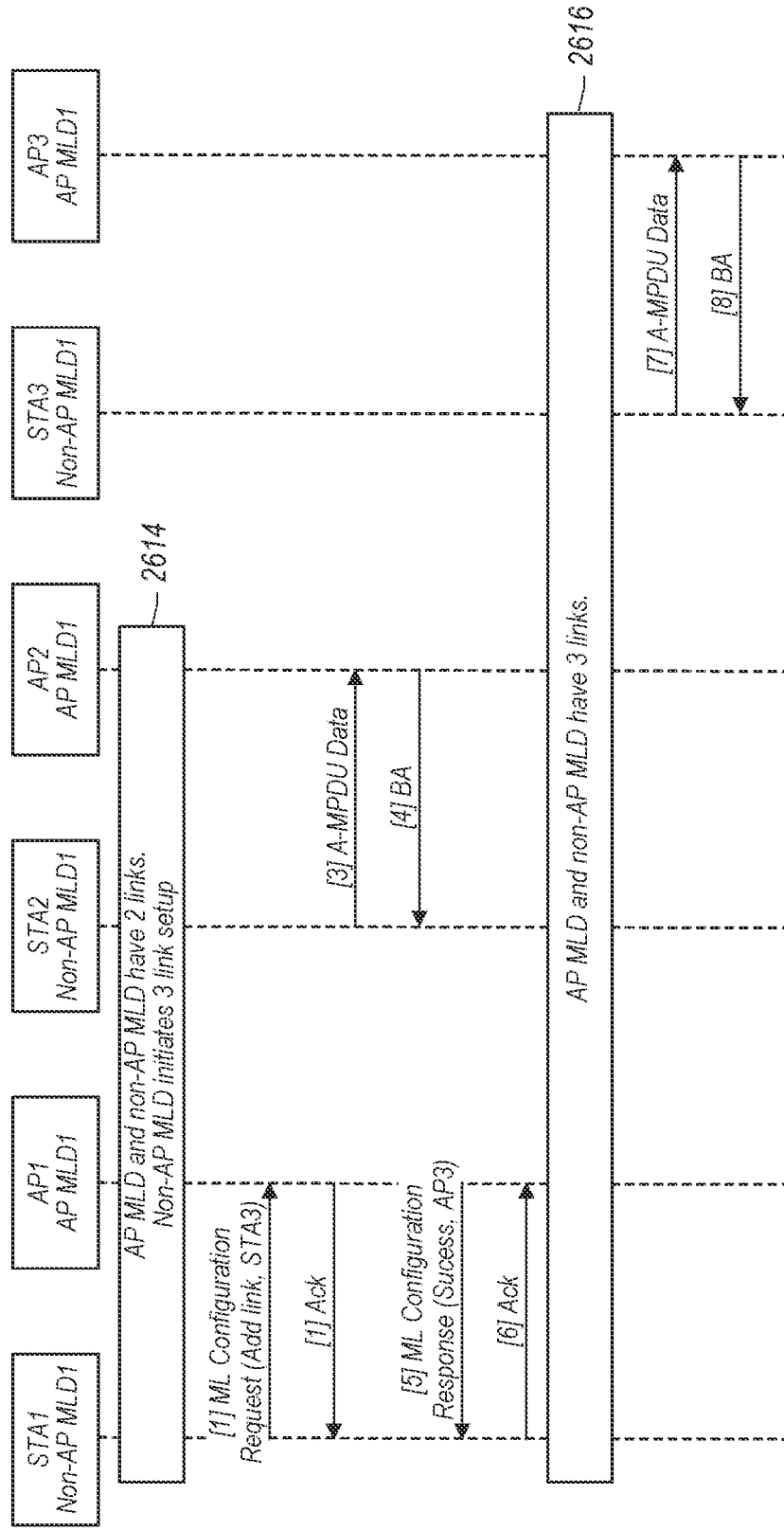

FIG. 26 illustrates an example of link reconfiguration, according to some embodiments. As shown, the AP MLD and non-AP MLD may have 2 links. The non-AP MLD may request a third link (2614), according to some embodiments. To do so, the non-AP MLD may request configuration of STA 3, e.g., in message [1]. Following reconfiguration, the MLDs may have 3 links (2616), and may use them to exchange and acknowledge data.

In ML reconfiguration, the non-AP MLD and AP MLD may maintain the same security. Non-AP MLD may request to add and/or delete a link. AP MLD may accept or reject the link deletion. Reconfiguration ML element may be used to communicate single link changes. When AP switches a channel, the link may be maintained. No additional signaling may be needed from the non-AP MLD to continue operating in the link, e.g., on the new channel.

One use case of the method of FIG. 9 may include soft APs performing a capability change. A soft AP may refer to a device such as a smart phone acting (e.g., temporarily as an AP). An AP MLD may change its affiliated AP capabilities. The operations parameters may be changed and new values of these elements may be signaled through Change Sequence Number and Critical BSS Update fields in the Beacon and Probe response frames. However, capability parameters such as HT capabilities, VHT capabilities, HE Capabilities, EHT capabilities may not be changed in the same manner, according to some embodiments. One possibility for performing such an update of affiliated AP capability parameters is to do a channel switch according to the method of FIG. 9. For example, an affiliated AP may (e.g., at least) selects a new primary channel in order to ensure that all STAs detect the change in AP parameters. The AP MLD may signal the channel switch as described above with respect to FIG. 9. In some cases, the affiliated AP may do the channel switch to the same channel and only change its capabilities. The AP MLD may time the channel switch to align with the change in capabilities and thus may allow the associated STAs to prepare for the new parameter and/or capability values. As one example, such a parameter/capability change may be performed to save power (e.g., in response to battery level of the soft AP MLD) or otherwise adapt to changing circumstances. As another example, this may allow the soft AP MLD to modify its AP operation, e.g., by switching to an IDLE channel. The IDLE channel may be a channel that does not have interference or other transmissions. All transmission resources of the IDLE channel may be available for the AP.

Additionally, the method of FIG. 9 may increase AP availability (e.g., and decrease latency, delay, etc.).

FIG. 27 illustrates a channel switch, according to some embodiments. As shown, an AP1 may operate on link 1 and may transmit (e.g., on link 1) beacons indicating that it will switch channels. After the switch, the AP1 may operate on a new channel and may transmit beacons, e.g., without signaling related to the channel switch. The maximum channel switch time may be indicated in beacons transmitted by AP2 and/or AP3 during the channel switching time. Thus, non-AP MLDs may use the indication of the maximum channel switching time to determine when AP1 may begin operating on the new channel.

FIG. 28 illustrates an extended channel switch element, according to some embodiments. Such an extended channel switch element may be included in beacons transmitted prior to a channel switch, e.g., by the switching AP and/or an affiliated AP. The extended channel switch element may include an element ID, length, channel switch mode, new operating class, new channel number, and channel switch count. The new operating class and new channel number may indicate the channel on which the AP will operate after the switch. The channel switch count may describe a number of TBTTs before the switch. A channel switch mode may describe whether associated STAs may transmit in the old channel during the grace period or not. For instance, if an AP or STA detects a radar in its old operating channel, the AP may not allow its associated STAs to continue operating in the channel.

FIG. 29 illustrates a maximum channel switch time element, according to some embodiments. The maximum channel switch time element may be included in beacons transmitted by affiliated APs during the channel switch time. The switch time may indicate a number of time units (TU) that the AP will continue to operate in the first/old channel.

Figure 30:
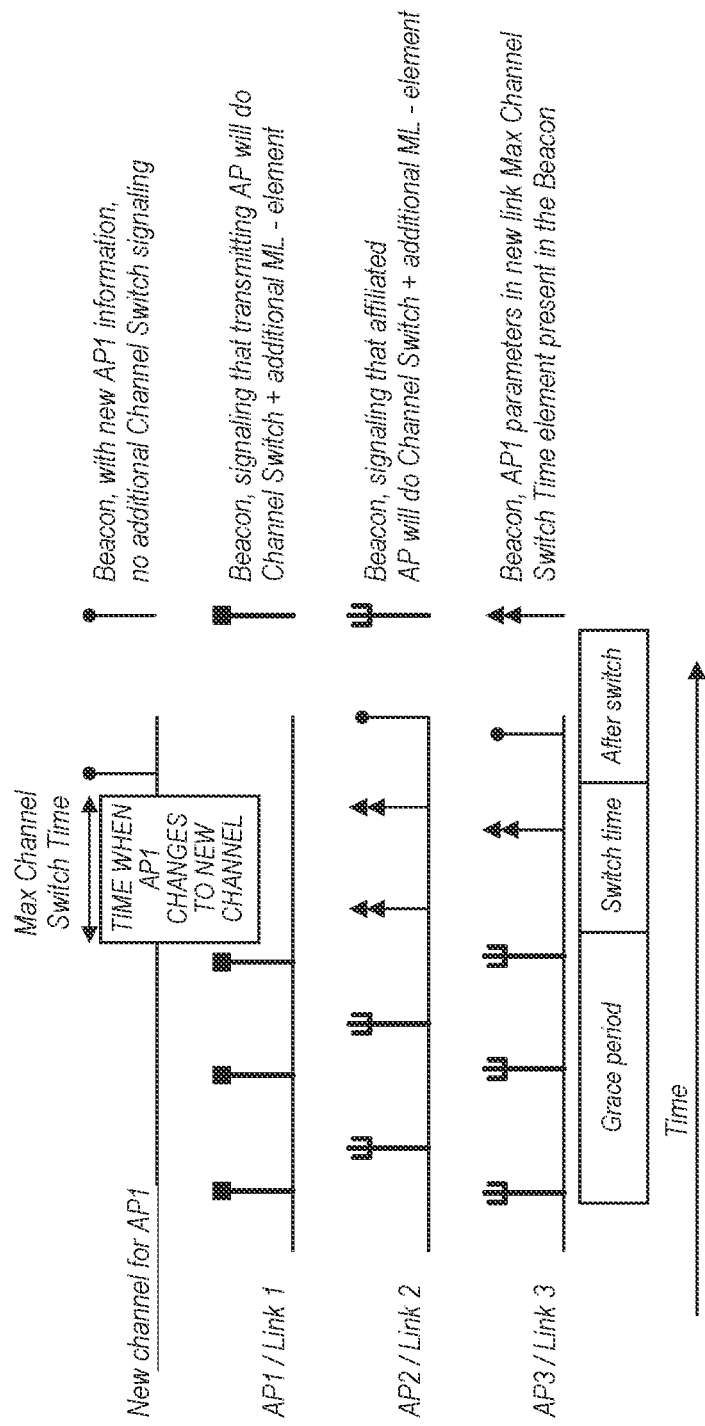

FIG. 30 illustrates a channel switch including use of ML elements (e.g., as described with respect to FIG. 17), according to some embodiments.

As shown, an AP1 may operate on link 1 and may transmit (e.g., on link 1) beacons indicating that it will switch channels. Beacons transmitted by AP1 during the grace period (e.g., after a switch is determined and prior to the switch) may include an ML element, e.g., a reconfiguration variant. For example, the ML element may include a per-STA profile indicating operating parameters implemented for the AP1 after the switch. Beacons transmitted by AP1 prior to the switch may include an extended channel switch element.

During the grace period, AP2 and/or AP3 may transmit beacons on their respective channels. These beacons may include extended channel switch elements. Further, these beacons may include ML elements, e.g., of the reconfiguration variant. For example, the ML elements may include a per-STA profile indicating operating parameters implemented for the AP1 after the switch. The ML elements of beacons transmitted by AP2 and/or AP3 may differ from those of beacons transmitted by AP1 (e.g., by identifying that AP1 is an affiliated AP, rather than the transmitting AP, as in the case of beacons transmitted by AP1).

During the switch, AP2 and/or AP3 may transmit beacons on their respective channels. These beacons may include maximum channel switch time elements. Further, these beacons may include ML elements, e.g., of the reconfiguration variant. For example, the ML elements may include a per-STA profile indicating operating parameters implemented for the AP1 after the switch.

After the switch, the AP1 may operate on a new channel and may transmit beacons, e.g., without signaling related to the channel switch. After the switch, AP2 and/or AP3 may continue operating on their respective channels and transmitting beacons, e.g., without signaling related to the channel switch.

It will be appreciated that any or all of the beacons during the grace period and/or switching period may include an ML element indicating operating parameters implemented for the AP1 after the switch, according to some embodiments. For example, beacons in the grace period transmitted by AP2 and/or 3 may omit this information in some cases while the information may be included in beacons in the grace period transmitted by AP1 and during the switch by AP2 and/or AP3.

The following table provides an example of the types of information include in beacons during different time periods, according to some embodiments.

| Period | ML element | RNR | Other element |
|---|---|---|---|
| Grace period | Basic Variant with AP parameters in the old link, Reconfiguration Variant with AP new link parameters | The old operating channel of the AP | Extended Channel Switch or Channel Switch element |
| AP Channel Switch time | Basic Variant with AP information in the new link | The New operating band & channel of the AP | Max Channel Switch Time element |
| Post switch | Basic Variant with AP information in the new link | The New operating band & channel of the AP | None |

During a grace period when one or more APs are switching channel, a reconfiguration variant ML element may be added to beacons and ML-Probe Responses (e.g., by changing APs and/or other affiliated APs). The ML element may contain one per-STA Profile subelement for each AP that is in a grace period for an upcoming channel switch. The basic variant and reconfiguration variant ML element may be similar, according to some embodiments. The reconfiguration ML element may include a Link ID and Delete Request as additional fields, among various possibilities.

When a reconfiguration-variant ML element is added to a beacon or ML-Probe Response, the Link Id may identify the AP for which parameters are listed in a corresponding per-STA profile. For example, a new Link Id is set to 15 (signaling unknown value), e.g., for a per-STA profile describing the added AP or AP after the change. Similarly, a delete request may be indicated as a link ID set to 0. Thus, for a reconfiguration ML element associated with a channel switch, a per-STA profile of the AP prior to the switch may include a link ID set to 0 and a per-STA profile for the AP after the channel switch may include a link ID set to 15. Both per-STA profiles for the AP may be included in the same ML element. Thus, the ML element may include both the parameters of the AP prior to and after the channel switch.

Figure 31:
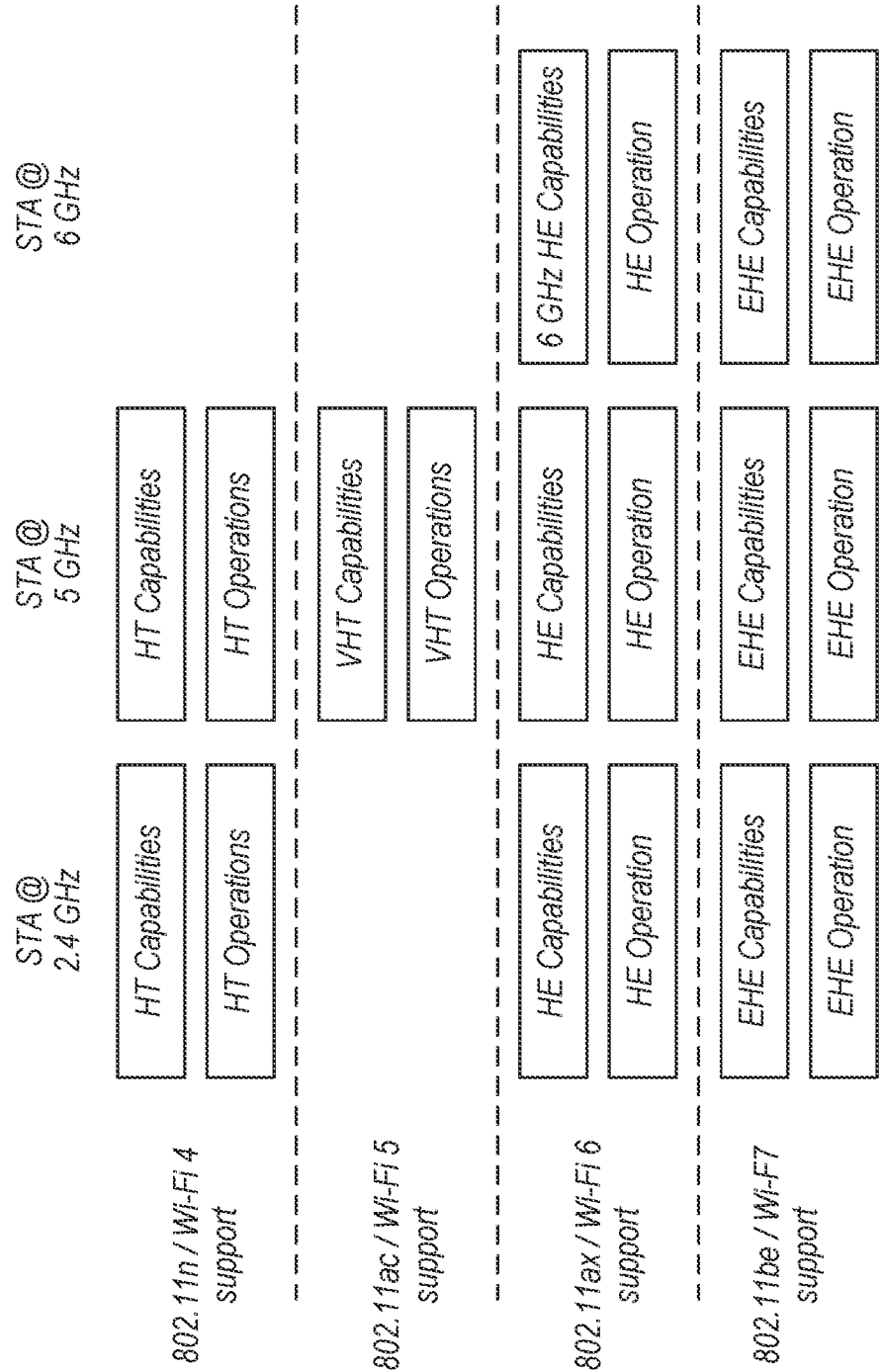

FIG. 31 illustrates capabilities and operations in different bands according to different 802.11 standards, according to some embodiments.

As noted above, a channel switch may or may not include a change in parameters of the AP, according to some embodiments. Correspondingly, a channel switch may be indicated differently depending on whether a change in parameters is included, e.g., as illustrated in FIGS. 32-33.

FIG. 32 illustrates a beacon frame format, when a channel switch does not change AP MLD or switching AP parameters (e.g., parameters of the AP MLD and switching AP are the same after the switch as before the switch). For example, the beacon may be transmitted by a first AP prior to a channel switch by a changing AP (e.g., AP1). AP1 may be the same or different than the first AP that transmits the beacon. The channel switch may not change AP1's parameters. The beacon frame may include link specific information (e.g., BSSID, capabilities, etc.) and a RNR, e.g., as discussed with respect to FIG. 10. Further, the beacon frame may include an ML element with per-STA profiles for the affiliated APs. The ML element may further include a bit indicating that the channel switch will occur without change in parameters.

In some embodiments, information about whether/how the parameters are changing may be included in a channel switch element.

FIG. 33 illustrates a beacon frame format, when a channel switch does change AP MLD or switching AP parameters (e.g., parameters of the AP MLD and/or switching AP are not the same after the switch as before the switch). For example, the beacon may be transmitted by a first AP prior to a channel switch by a changing AP (e.g., AP1). AP1 may be the same or different than the first AP that transmits the beacon. The channel switch may change AP1's parameters. The beacon frame may include link specific information (e.g., BSSID, capabilities, etc.) and a RNR, e.g., as discussed with respect to FIGS. 10 and 32. Further, as in FIG. 32, the beacon frame may include an ML element with per-STA profiles for the affiliated APs. In addition, the beacon frame may include a second ML element of the reconfiguration variant. The reconfiguration variant ML element may describe the affiliated APs of the AP MLD after the switch, e.g., in the ML control, common information, and/or link information fields. Further, a per-STA profile of AP1 describing the parameters of AP1 to be in place after the switch may be included.

FIG. 34 illustrates possible encoding and values of an ML type subfield, e.g., of an ML control field, according to some embodiments. As shown, the ML type subfield may indicate basic, probe request, or reconfiguration variants of an ML element.

FIG. 35 illustrates possible subelement IDs for a ML element, according to some embodiments.

A per-STA subelement may start with a per-STA control field. FIG. 36 illustrates a per-STA control field transmitted by a non-AP and FIG. 37 illustrates per-STA control field transmitted by an AP (e.g., AP MLD).

In association with a channel switch, associated non-AP MLDs may take various courses of action.

As one possibility, a STA may continue to operate with parameters signaled (e.g., by the STA to the AP MLD) in initial association/link setup. The parameter value used by the STA post-switch may be the larger of the parameter value indicated by the STA at the time of association or the parameter value indicated for the AP in the new channel/link). In other words, the non-AP may lower its parameter values in response to the AP lowering its parameter values. Further, the STA may limit its bandwidth and NSS by using an operating mode indication (OMI), e.g., if the STA is not capable of operation with the same parameters in the new channel (or otherwise determines to lower its parameters). Such an OMI may be transmitted prior to, during, or after the channel switch. If the STA does nothing (e.g., does not transmit an indication of capability or other data), then the AP may consider the STA in new channel to be in power save mode and the AP may not send traffic to the STA on the new channel (e.g., until the STA validates the new channel).

As another possibility, a non-AP MLD may add a link to AP in new channel by using ML reconfigure. In other words, the non-AP MLD may request to the AP MLD that it add such a link. The non-AP MLD may indicate requested parameters for the new link, e.g., using a per-STA profile in the ML element, according to some embodiments.

As another possibility, the non-AP MLD may reconfigure the parameters of the affiliated STA (e.g., on the non-AP side) that has a link with the switching AP. In other words, the non-AP MLD may request parameters for the affiliated AP in response to an indication that the channel switch may occur. For example, the non-AP MLD may (e.g., via an affiliated STA linked to the changing AP and/or via a different STA) send an ML Reconfigure Request (e.g., an ML element, reconfiguration variant) with requested modified parameters for the STA and AP.

Figure 38:
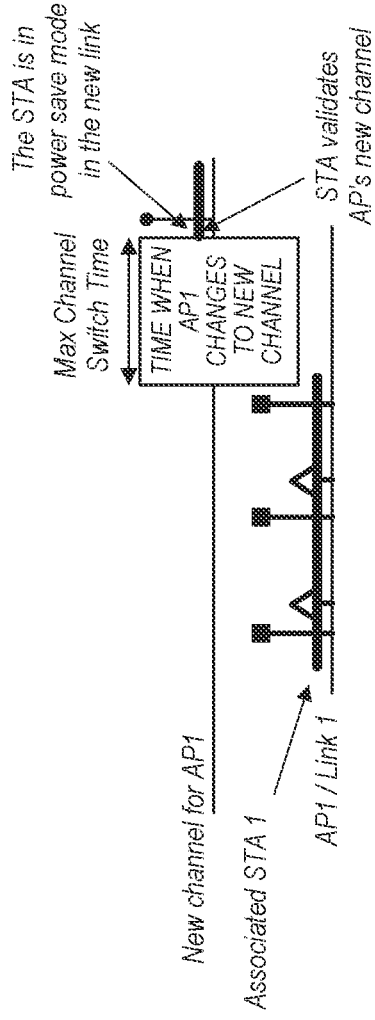

FIG. 38 illustrates operation of a STA 1 in association with an AP1, according to the possibilities discussed in the three previous paragraphs, e.g., continuing the link in the new channel. As indicated by the heavy line in the figure, associated STA 1 may operate in communication with AP1 over link 1 prior to the channel switch. Subsequent to the channel switch, the STA 1 may validate the new channel and may resume operating in communication with AP1 on the new channel. AP1 may consider the STA1 to be in a power save mode and/or may not send any downlink data to STA 1 (e.g., via the new link) until STA1 validates the new link.

As a further possibility, the non-AP MLD may terminate the link in association with a channel switch, according to some embodiments. For example, the STA may send ML reconfigure and signal link deletion. The non-AP MLD may signal link deletion if the non-AP MLD cannot operate (e.g., with acceptable performance, parameters, etc.) in the new channel due to interference of other radios, other links, etc. For example, if interference at the non-AP MLD is above a threshold on the new channel (e.g., due to activity of other radios or other links of the non-AP MLD and/or activity of other devices), the non-AP MLD may determine to terminate the link and may signal accordingly to the AP MLD.

Figure 39:
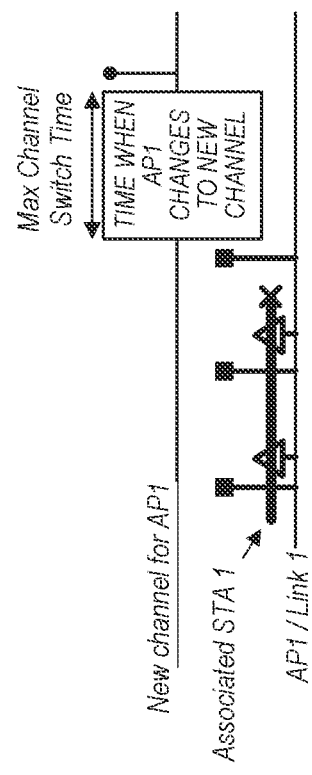

FIG. 39 illustrates operation of a STA 1 in association with an AP1, according to the possibility discussed in the previous paragraph, e.g., terminating the link. As indicated by the heavy line in the figure, associated STA 1 may operate in communication with AP1 over link 1 for a period of time prior to the channel switch. In response to an indication of the channel switch, level of interference, and/or other information, the STA 1 may terminate the link. The termination may be prior to the channel switch time or coincident with the channel switch time.

As noted above regarding FIG. 9, a channel switch may be in response to a request from a non-AP MLD. For example, a non-AP MLD may transmit, to the AP MLD, an association request or other message with a ML element in order to request the new link(s) be setup or existing link(s) be modified. For example, the ML element may be a basic variant. The ML element may include a complete per-STA profile for each link that the non-AP MLD requests.

In response, the AP MLD may transmit, to the non-AP, an association response or other message. The response may include an ML element. The ML element may be a basic variant. The ML element may include a complete per-STA profile for each link that the AP MLD will provide. In some embodiments, the ML element may include a complete per-STA profile for each link that the AP MLD accepts (e.g., of the links requested by the non-AP MLD).

In some embodiments, the association request and response may not contain RNR. In some embodiments, RNR may be included.

The following table describes ML elements that may be used in association requests and responses in various time periods, according to some embodiments.

| Time period | ML element in Association Request | ML element in Association Response |
| --- | --- | --- |
| Grace period | Basic Variant with AP parameters in the old link (legacy operation), Basic Variant with AP parameters in the new link (new operation) | If Association Response contains the AP parameters to the same link as in association request |
| AP Channel Switch time | Basic Variant with AP information in the new link | Basic Variant with AP information in the new link |
| Post switch | Basic Variant with AP information in the new link | Basic Variant with AP information in the new link |

The following table describes non-AP MLD operation during various time periods, according to some embodiments. The second column describes operations that may be performed in embodiments where parameters for an AP are signaled, by the AP MLD, prior to the AP changing channels. The third column describes operations that may be performed when the AP MLD does not signal the post-switch parameters prior to the switch.

| Time period | With pre-switch signaling of parameters from AP MLD | Without pre-switch signaling of parameters from AP MLD |
| --- | --- | --- |
| Prior to grace period (e.g., before AP MLD indicates channel switch) | Non-AP MLD may transmit, to AP MLD, request for new AP and/or changed channel for an AP. Non-AP MLD may indicate requested parameters. | |
| During grace period (e.g., after receiving a beacon indicating channel switch and prior to the channel switch) | Non-AP MLD may signal capabilities and operation parameters that are compatible with current band/channel and/or the new band/channel of the AP. | Non-AP MLD may signal capabilities and operation parameters that are compatible with current band/channel of the AP. |
| During channel switch | Non-AP MLD may configure its parameter values for the AP parameters that will be in effect after the channel switch. Non-AP MLD may signal parameters and/or capabilities for the new band/channel to the AP MLD. | Non-AP MLD may wait for the channel switch to complete. |
| Post channel switch | Non-AP MLD may use parameters used in the new band/channel of the AP. | Non-AP MLD may detect new parameters of the AP. Non-AP MLD may |

| Time period | With pre-switch signaling of parameters from AP MLD | Without pre-switch signaling of parameters from AP MLD |
| --- | --- | --- |
| | Non-AP MLD may signal parameters and/or capabilities for the new band/channel to the AP MLD. | configure its parameter values for the new AP parameters. Non-AP MLD may signal parameters and/or capabilities for the new band/channel to the AP MLD. |

FIGS. 40-49 and Operating Channel Validation (OCV)

In some embodiments, association information may not be encrypted or integrity protected. An attacker may send an association response with incorrect information resulting to in interoperability problems.

Operating Channel Validation (OCV) may be a means to signal and validate the following parameters: the BSS primary channel, secondary 20 MHz, and/or 80+80 MHz configurations (e.g., 160 MHz of bandwidth in two portions of 80 MHz), among various possibilities.

A non-AP MLD (e.g., STA) may validate the parameters, e.g., ensure that an AP operates in the channels and/or with the parameters that the AP (e.g., or other affiliated AP of the AP MLD) has signaled. The AP MLD may transmit operating channel information (OCI) to the non-AP MLD. The OCI may indicate the channels and/or parameters for one or more AP. Thus, a STA may be able to send and receive data with an AP based on validating the AP using the OCI.

Embodiments described herein provide systems, methods, and mechanisms for AP MLD and non-AP MLD to perform OCV of multiple links. For example, according to embodiments of FIG. 40, links between any number of affiliated APs and affiliated STAs may be validated and used to exchange data securely.

Figure 40:
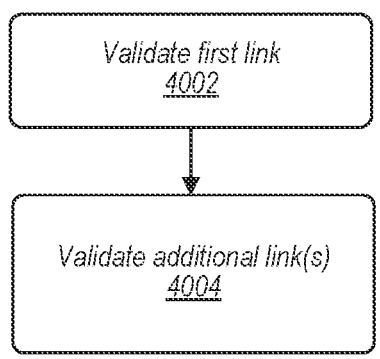
FIG. 40 illustrates an example method of operating channel validation of multiple channels, according to some embodiments.

Aspects of the method of FIG. 40 may be implemented by AP MLD in communication with a non-AP MLD. The AP MLD and/or non-AP MLD may be as illustrated in and described with respect to various ones of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. For example, one or more processors (or processing elements) (e.g., processor(s) 101, 204, 302, 402, 432, 434, 439, baseband processor(s), processor(s) associated with communication circuitry such as 130, 230, 232, 329, 330, 430, etc., among various possibilities) may cause a wireless device, STA, UE, non-AP MLD, and/or AP MLD, or other device to perform such method elements.

Note that while at least some elements of the method of FIG. 40 are described in a manner relating to the use of communication techniques and/or features associated with IEEE and/or 802.11 (e.g., 802.11be) specification documents, such description is not intended to be limiting to the disclosure, and aspects of the method of FIG. 40 may be used in any suitable wireless communication system, as desired.

The methods shown may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

A non-AP MLD 106 may validate a first link with an AP MLD 112 (4002), according to some embodiments. The first link may be validated as part of a 4-way handshake and association. The first link may be between a first affiliated AP (e.g., 812*a*, 812*b*, or 812*c*, etc.) and a corresponding first STA (e.g., 806*a*, 806*b*, or 806*c*, etc.). The first link may operate on a first channel.

The AP MLD may transmit, to the non-AP MLD information about one or more other affiliated APs (e.g., 812*a*, 812*b*, or 812*c*, etc.). For example, the information may be or include OCI. For example, the AP MLD may transmit a reduced neighbor report (RNR) or ML element including the information, e.g., including an OCI element. The information may be transmitted as part of a beacon, probe response (e.g., in response to a probe request from the non-AP MLD), and/or an association response (e.g., in response to an association request from the non-AP MLD for the first link). The information may be transmitted prior to validation of the first link, concurrently with validation of the first link, and/or after validation of the first link. The information may be transmitted by the first AP and received by the first STA and/or the information may be transmitted by a second AP and received by a second STA via a second channel.

The non-AP MLD 106 may validate a second link with the AP MLD 112 (4004), according to some embodiments. The non-AP MLD 106 may validate any number of additional links with the AP MLD 112. For example, links between any affiliated AP (e.g., 812*a*, 812*b*, or 812*c*, etc.) and a corresponding STA (e.g., 806*a*, 806*b*, or 806*c*, etc.) may be validated.

In order to validate a link (e.g., the second link), the following steps may occur, according to some embodiments. The AP MLD 112 may transmit a beacon using the affiliated AP corresponding to the link. The non-AP MLD 106 may receive the beacon. The non-AP may confirm that the beacon corresponds to previously known information about the AP. For example, the non-AP may compare attributes of the received beacon (e.g., operating class, primary channel number, etc.) to attributes indicated by the AP MLD in an OCI element.

If the attributes do not match, the AP MLD may determine that the beacon is not valid. As a result, the AP MLD may not respond to the beacon. Moreover, the AP MLD may not transmit data on the link unless or until a valid beacon is received.

If the attributes do match, the non-AP MLD may determine that the beacon is valid and may transmit an uplink message (e.g., data) to the AP MLD using the link. For example, the transmission may be from an affiliated STA corresponding to the link. The AP MLD may receive the data using an affiliated AP corresponding to the link.

After the beacon is received by the non-AP MLD and the uplink message is received by the AP MLD, both devices may consider the link to be validated. Thus, the device may be used to exchange further messages in the uplink and/or downlink direction.

Figures 41, 42:
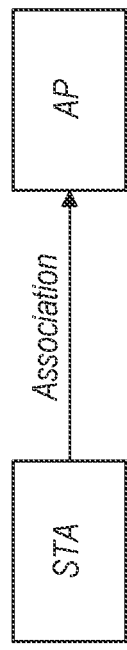

FIG. 41 illustrates a STA associating with an AP, according to some embodiments. In the illustrated example, a single link is used.

FIG. 42 illustrates an example of an OCI element, according to some embodiments. An AP MLD may send such an OCI element to describe an affiliated AP operating on a particular channel. A non-AP MLD may use the information to determine whether a beacon it receives is a valid beacon of the affiliated AP. Additional illustration of OCI elements, e.g., as may be used in multi-link communication, are described with respect to FIGS. 47-48.

Figure 43:
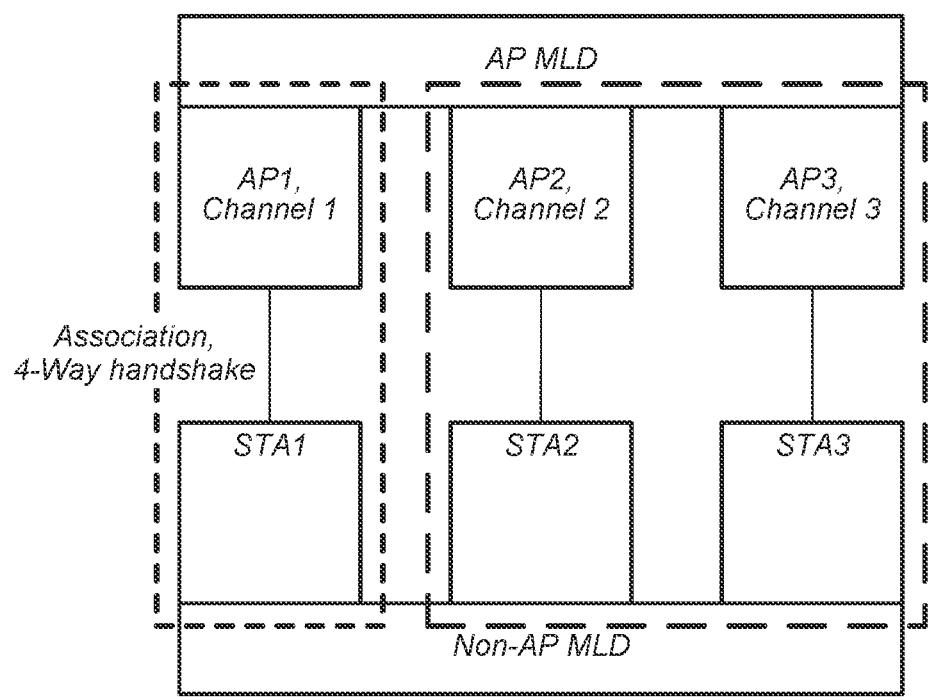

FIG. 43 illustrates an AP MLD in communication with a non-AP MLD, according to some embodiments. The link between AP1 and STA1 may be a first link, e.g., that may be validated during a process of association and 4-way handshake. The other links (e.g., between AP2-STA2 and AP3-STA3) may be validated also, as described with respect to 4004 above.

Figure 44A:
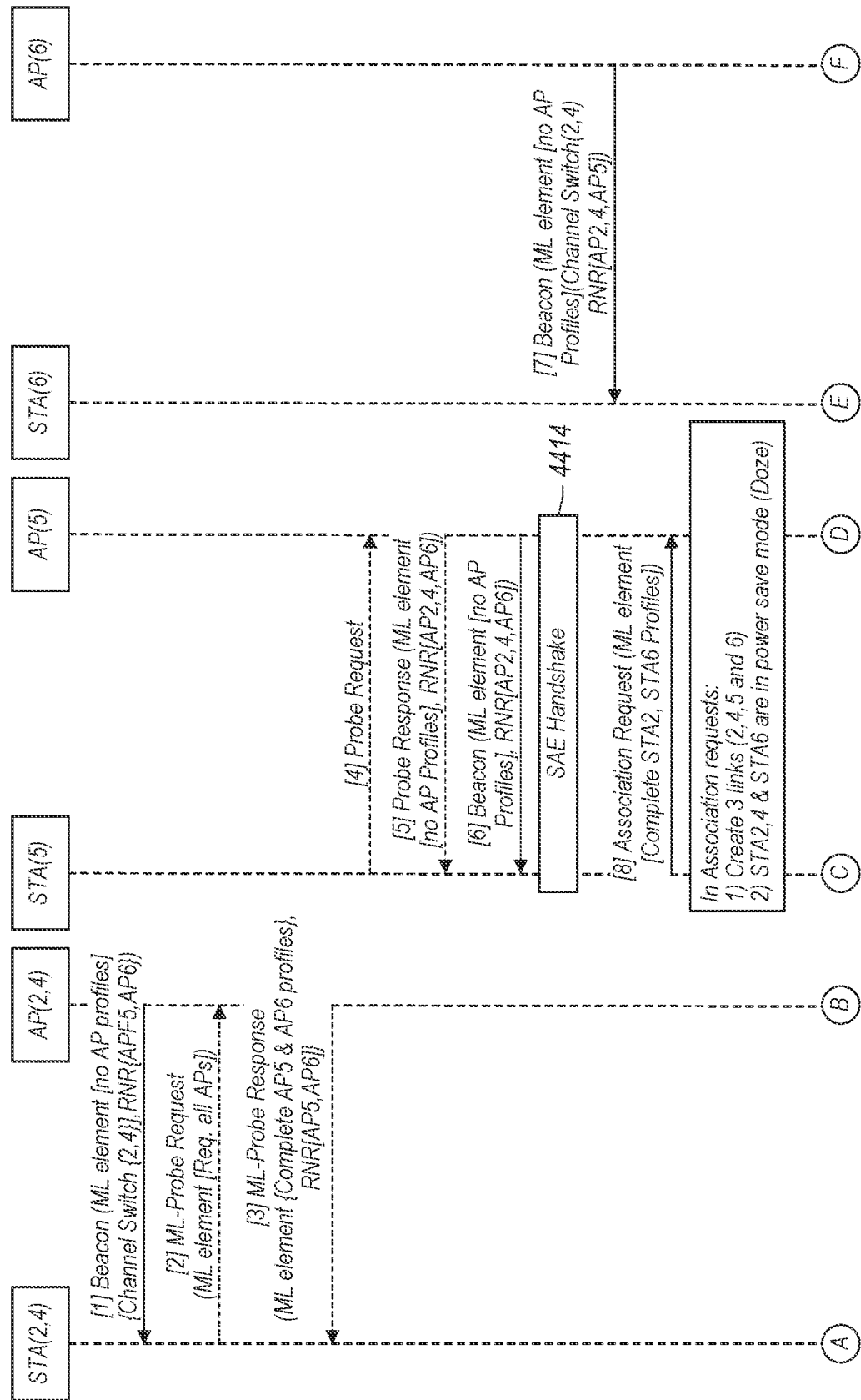
Figure 44B:
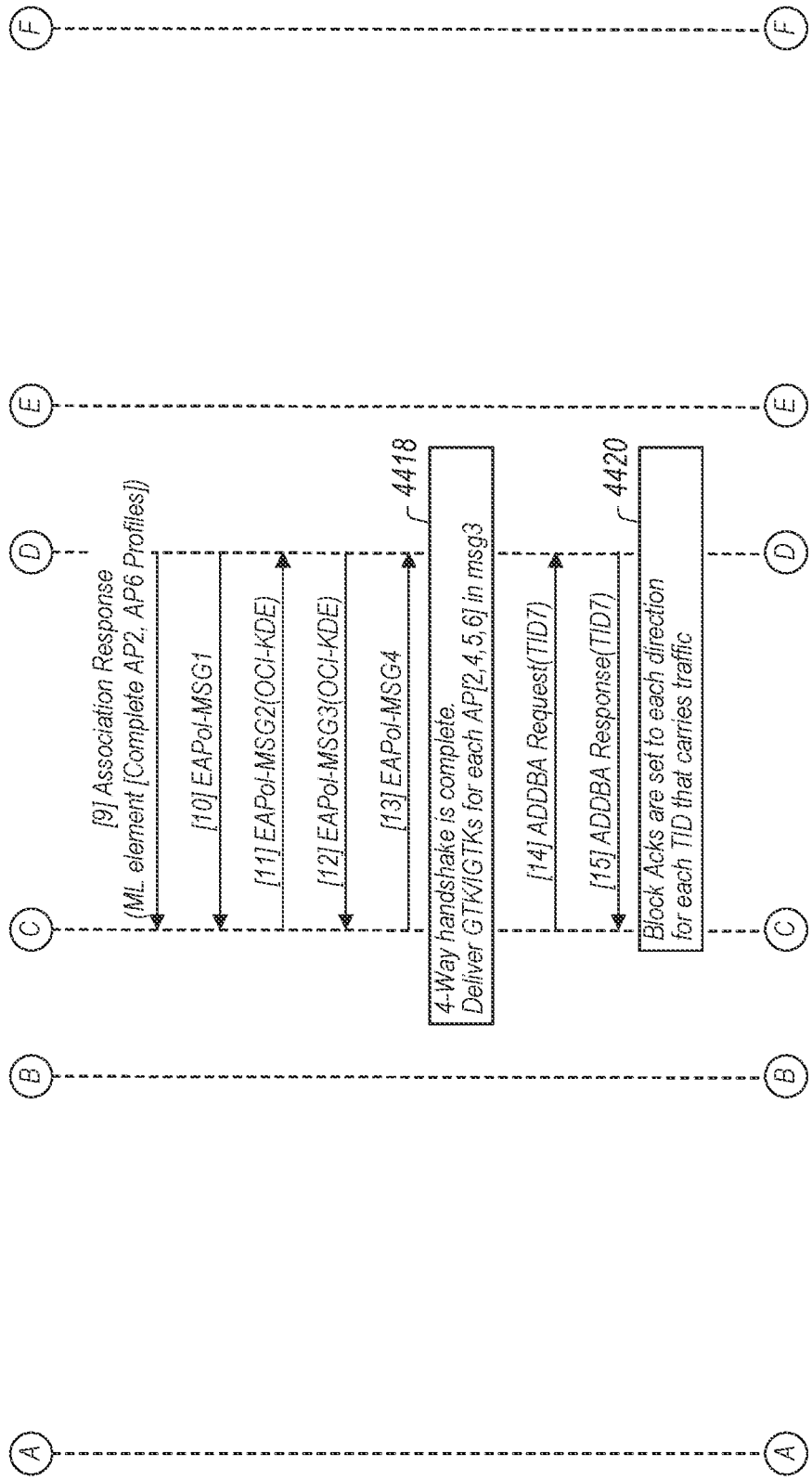
Figure 44C:
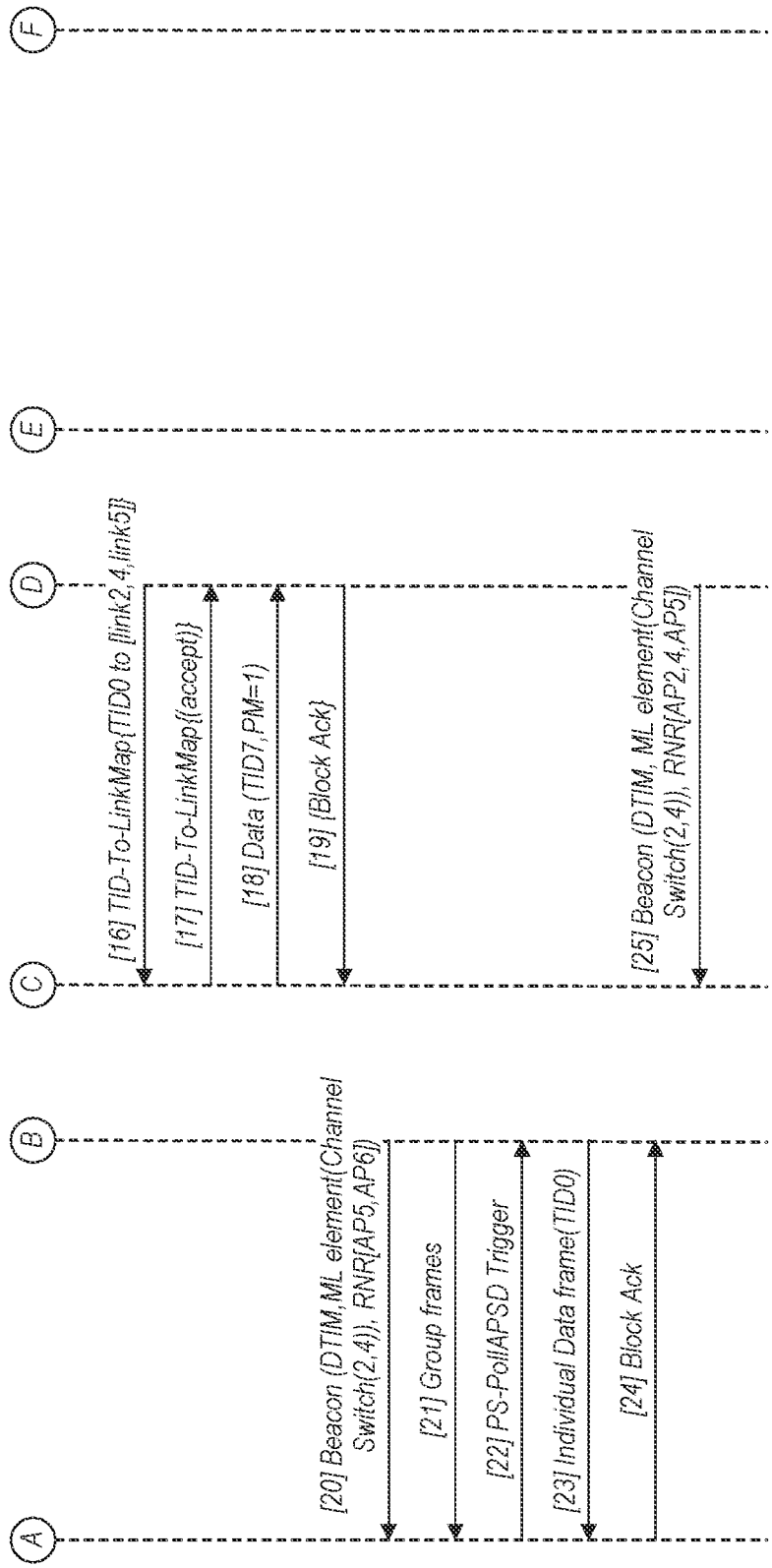

FIGS. 44A, 44B, and 44C illustrate an example of OCV in a ML setup process, according to some embodiments. The process may proceed as follows:

[1] A first AP illustrated on vertical line B may transmit a beacon to a first STA. The beacon may be transmitted on channel 2. The beacon may contain an ML element, without AP profiles. The beacon may indicate that the first AP may switch from channel 2 to channel 4. The beacon may include a RNR describing APs on channels 5 and 6. These APs are illustrated on vertical lines D and F respectively. A first STA (vertical line A) may receive the beacon on channel 2.

[2] The first STA may transmit a ML-probe request to the first AP on channel 2. The probe request may include an ML element requesting information about all affiliated APs.

[3] The first AP may transmit, on channel 2, to the first STA, an ML probe response. The response may include an ML element with complete profiles for the APs operating on channels 5 and 6.

[4] A second STA, operating on channel 5, may transmit a probe request to the second AP operating on channel 5.

[5] In response to the probe request, the second AP may transmit a probe response including an ML element with no AP profiles and an RNR identifying the APs on channels 2 (changing to channel 4) and 6. Thus, the non-AP MLD may receive channel information about all the affiliated APs at this time. Timing information for the channel switch may be included.

[6] The second AP may transit a beacon including an ML element with no AP profiles and an RNR identifying the APs on channels 2 (changing to channel 4) and 6. Thus, the non-AP MLD may receive channel information about all the affiliated APs at this time. Timing information for the channel switch may be included. The beacon may be instead of or in addition to the probe response in [5].

The AP MLD and non-AP MLD may begin a SAE handshake (4414), e.g., using channel 5.

[7] The third AP may transmit a beacon including an ML element with no AP profiles and an RNR identifying the APs on channels 2 (changing to channel 4) and 5. Timing information for the channel switch may be included.

[8] The second STA may transmit an association request message, including an ML element with complete profiles for the first STA (on channel 2) and third STA (on channel 6, illustrated on vertical line E). The association request message may request association for the STAs listed in the ML element. Thus, the association request may indicate requests for 3 links (e.g., the first STA on channel 2 later on channel 4, and the second and third STAs on channels 5 and 6, respectively). The association request may indicate that the first and third STAs are in a power save mode.

[9] The second AP may transmit an association response, including complete profiles for the first and third APs.

[10-13] The second AP and second STA may perform a 4-way handshake, including messages 1-4. A key distribution element (KDE), group temporal key (GTK), and integrity group temporal key (IGTK) may be exchanged. The GTK may encrypt group frames. The IGTK may be used for integrity protection of group frames. The handshake may include, e.g., in msg3 [12] information (e.g., OCI) for all links. Thus, at this time, the non-AP MLD may receive information sufficient to validate links with any or all of the affiliated APs. The 4-way handshake may be completed (4418). The non-AP MLD may consider all of the links validated at this time. However, the AP MLD may consider the first and third links to be inactive (e.g., in a power save mode) until a further indication or message is received from the non-AP MLD.

In some embodiments, the link validation may require that a STA affiliated with the associated non-AP MLD transmits or receives a frame from the AP affiliated with the associated AP MLD in a validated link. There may be a Probe Request/response and Beacon frames reception before the 4-way handshake. This could be considered as the needed TX or RX. In other words, the validation may be based in part on a frame exchanged in the uplink or downlink direction prior to the handshake. In some embodiments, a non-AP MLD may send additional encrypted and integrity protected frames in these validated links after receiving OCI values.

[14] The second STA may transmit an add block acknowledgement (ADDBA) request to the second AP. The ADDBA request may request to initiate block acknowledgement (BA) for one or more traffic identifiers (TID), e.g., TID7. [15] The second AP may transmit a response. BA may be initiated in each direction, for the requested TID (4420).

[16] The second AP may transmit a message linking a TID0 to the traffic on channels 2, 4, and 5.

[17] The second STA may accept the mapping.

[18] The second STA may transmit data and [19] the second AP may acknowledge the data with a BA.

[20] The first AP may transmit a beacon indicating the channel switch.

[21-24] The first STA may exchange data and BA with the first AP, e.g., on channel 2.

In some embodiments, the data exchange of [21-24] may validate the link. For example, the STA could check that its data is received and that it receives corresponding acknowledgement (e.g., BA) on the correct channel in response. If this exchange of data and acknowledgement does not occur, the non-AP MLD may consider channel validation failed and may stop operating with the AP MLD.

[25] The second AP may transmit a beacon indicating the channel switch.

Figure 45:
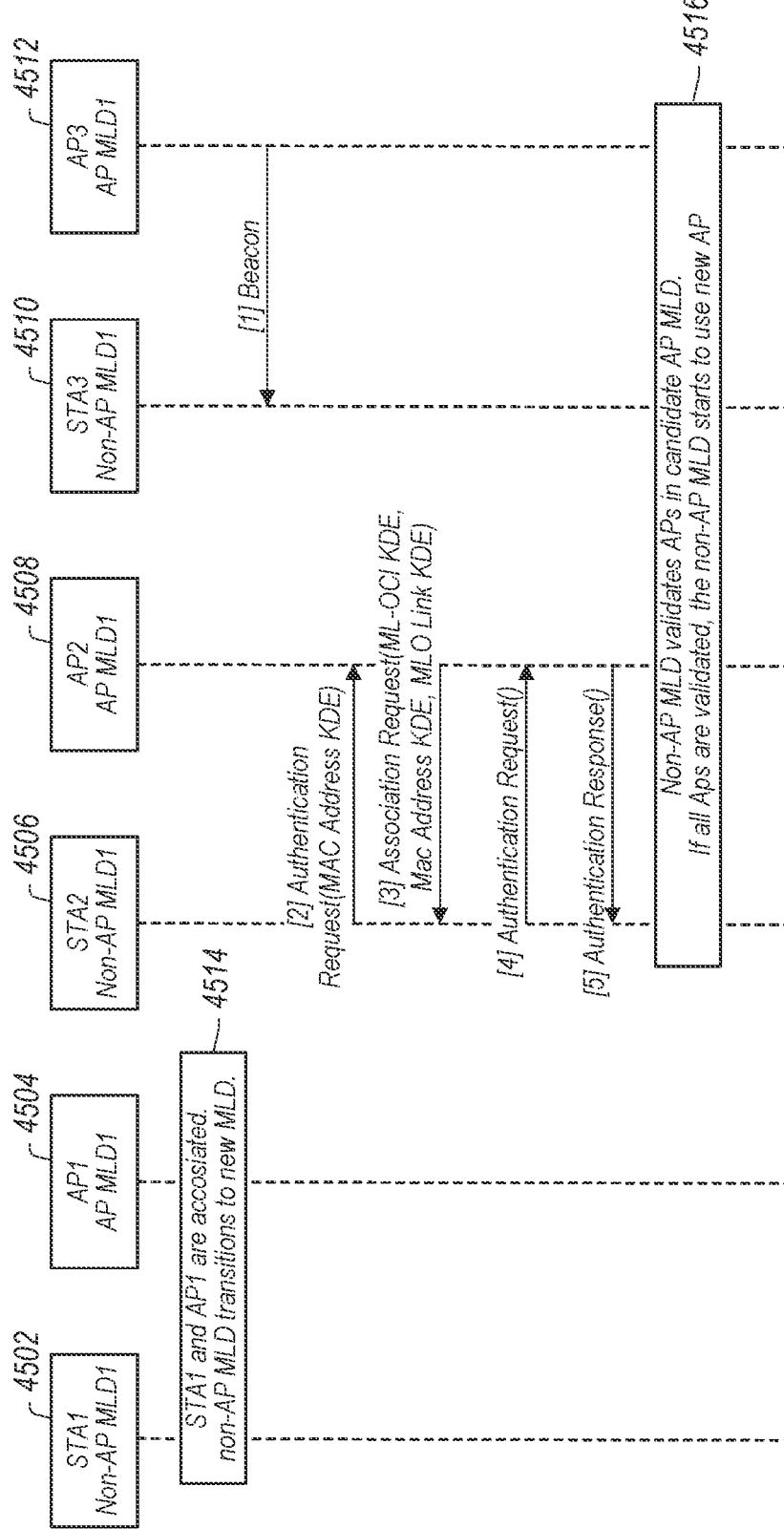

FIG. 45 illustrates an example of OCV in a fast ML transition (e.g., channel switch) process, according to some embodiments. The process may be between an AP MLD1 and a non-AP MLD1, which may have links between 3 corresponding affiliated STAs and APs. The process may proceed as follows:

STA1 (4502) of the non-AP MLD1 may be associated with a first AP1 (4504) of the AP MLD1. [1] AP3 (4512) may transmit a beacon. The beacon may include channel information (e.g., an RNR, identifying channels of the affiliated APs of the AP MLD1).

[2] STA2 may transmit an authentication request.

[3] In response to the authentication request, the AP2 may transmit an association request including ML-OCI, e.g., OCI for the affiliated APs of AP MLD1. Thus, the non-AP MLD may have sufficient information to validate the links.

[4-5] STA2 may transmit an association request and AP2 may transmit a response.

The non-AP MLD may validate all 3 links based on the OCI information and authentication response. The non-AP MLD may now begin using all APs.

Figure 46:
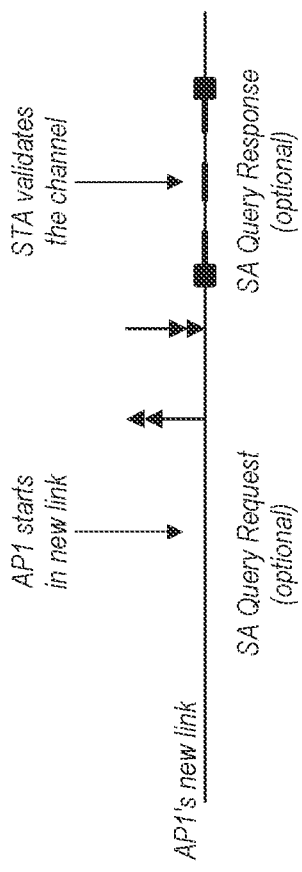

FIG. 46 illustrates an example of OCV in a channel switch (e.g., fast ML transition) process, according to some embodiments. A non-AP MLD may learn new channel information (e.g., OCI of an AP after a channel switch) in a beacon. The beacon may be integrity protected, e.g., with BIGTK. Link specific validation may be used, e.g., as discussed above.

In some embodiments, after the AP channel switch (e.g., after AP1 starts in a new link), the STA may send a robust SA Query Request to request encrypted information of AP's new channel. The AP may respond with a SA Query Response, e.g., providing security parameters. The SA Query Request and Response may be transmitted in any link(s). The SA Query may be transmitted during the time when AP is transitioning to new channel, according to some embodiments. The SA Query request may contain channel information of all APs or the APs to which the STA is associated.

The non-AP MLD may validate the link (e.g., based on receiving the SA query response or a beacon in the new channel). For example, the non-AP MLD may determine that attributes of a beacon or other message in the new channel match attributes indicated in the OCI.

Figure 47:
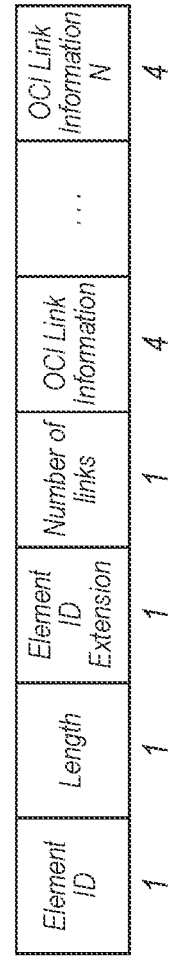

FIG. 47 illustrates a ML-OCI element, according to some embodiments. The ML-OCI element may include an indication of a number of links (e.g., N links) and link-specific OCI information for each of the number of links (e.g., N links). The link-specific OCI information may be an OCI link information field as described with respect to FIG. 48.

FIG. 48 illustrates an OCI link information field, according to some embodiments. The OCI information field may include similar information as discussed above for a single link with respect to FIG. 42.

FIG. 49 illustrates legacy elements/fields in comparison to new elements/fields described herein. Notably, various ML-OCI information is added. The ML-OCI information supports validation of multiple links.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In one set of embodiments, a method, may comprise: at an access point (AP) multi-link device (AP MLD): transmitting, for a first affiliated AP, first beacons on a first channel, wherein the first beacons indicate at least one parameter for operation of the first affiliated AP on the first channel; transmitting, for a second affiliated AP, second beacons on a second channel different from the first channel, wherein the second beacons indicate at least one parameter for operation of the second affiliated AP on the second channel; determining, prior to a first time, to perform a channel switch at the first time for the first affiliated AP from the first channel to a third channel different from the first channel; determining, prior to the first time, at least one parameter for operation of the first affiliated AP on the third channel; transmitting, for the first affiliated AP prior to the first time, a third beacon on the first channel, wherein the third beacon indicates the at least one parameter for operation of the first affiliated AP on the third channel; and transmitting, for the first affiliated AP subsequent to the first time, a fourth beacon on the third channel, wherein the fourth beacon indicates the at least one parameter for operation of the first affiliated AP on the third channel.

In some embodiments, the method may further comprise: transmitting, for the second affiliated AP prior to the first time, a fifth beacon on the second channel, wherein the fifth beacon indicates the at least one parameter for operation of the first affiliated AP on the third channel.

In some embodiments, the third beacon and the fifth beacon further indicate a maximum channel switching time that begins at the first time.

In some embodiments, the method may further comprise: transmitting, for the second affiliated AP during the maximum channel switching time, a sixth beacon on the second channel, wherein the sixth beacon indicates: the maximum channel switching time; and the at least one parameter for operation of the first affiliated AP on the third channel.

In some embodiments, the sixth beacon further indicates that the first affiliated AP is switching channels.

In some embodiments, the maximum channel switching time begins at the first time, wherein the third beacon and the fifth beacon further indicate the first time.

In some embodiments, the at least one parameter for operation of the first affiliated AP on the third channel is different from the at least one parameter for operation of the first affiliated AP on the first channel.

In some embodiments, the method may further comprise: transmitting, for the second affiliated AP, during a maximum channel switching time that the first affiliated AP is not available, a sixth beacon on the second channel, wherein the sixth beacon includes a reconfiguration variant multi-link element.

In some embodiments, the method may further comprise: exchanging, with a non-AP-MLD, data using the first affiliated AP on the first channel prior to the first time; and waiting until the non-AP-MLD validates the first affiliated AP on the third channel prior to transmitting data to the non-AP-MLD using the first affiliated AP on the third channel subsequent to the first time.

In a second set of embodiments, an apparatus may comprise: a processor configured to cause a non-access point (AP) multi-link device (MLD) (non-AP MLD) to: receive, from an AP MLD, a first message including: an indication that a channel switch for an affiliated AP will occur at a future time; and an indication of a first parameter value that will be used by the affiliated AP after the channel switch; prior to the future time: determine, based on the first parameter value, a second parameter value to be used by the non-AP MLD to communicate with the affiliated AP after the channel switch; and transmit, to the AP MLD, a second message including an indication of the second parameter value; and at the first time, implement the second parameter value; and after the channel switch, exchange data with the affiliated AP using the second parameter value.

In some embodiments, the processor is further configured to cause the non-AP MLD to: transmit, to the AP MLD, a request for the channel switch, wherein the request for the channel switch indicates at least one of the first parameter value or the second parameter value.

In some embodiments, the request for the channel switch comprises an association request; and the first message comprises an association request response.

In some embodiments, the request for the channel switch comprises a request to add the affiliated AP.

In some embodiments, the processor is further configured to cause the non-AP MLD to: transmit, to the AP MLD, a probe request, wherein the first message comprises a response to the probe request.

In some embodiments, the probe request comprises a multi-link (ML) element comprising a complete profile of the affiliated AP after the channel switch.

In some embodiments, the second parameter value corresponds to a same parameter as the first parameter value. In other words, the first and second parameter values may correspond to a common parameter type, e.g., they may both refer to a same setting/parameter and may have the same or different values.

In some embodiments, the processor is further configured to cause the non-AP MLD to validate a new link with the AP.

In a third set of embodiments, a non-access point (AP) multi-link device (MLD) (non-AP MLD), may comprise: a radio; and a processor operably coupled to the radio and configured to cause the non-AP MLD to: establish communication with an AP MLD on a first channel using a first affiliated AP of the AP MLD, wherein to establish communication comprises: performing a handshake with the AP MLD; receiving information for a second affiliated AP of the AP MLD; and validating the first affiliated AP; and validate the second affiliated AP of the AP MLD based on the information.

In some embodiments, to validate the second affiliated AP of the AP MLD comprises: receiving a beacon of the second affiliated AP on a second channel different from the first channel; and transmitting, to the AP MLD, data using the second affiliated AP on the second channel.

In some embodiments, said receiving the information occurs during one of: multi-link setup; or fast multi-link transition (e.g., channel switch).

In some embodiments, said receiving the information includes receiving a multi-link operating channel information element.

In some embodiments, device, comprising: an antenna; a radio coupled to the antenna; and a processing element coupled to the radio is configured to implement a method according to any of the preceding examples.

In some embodiments, a memory medium comprising program instructions that, when executed, cause a device to implement a method according to any of the preceding examples.

In some embodiments, a computer program comprising instructions for performing any of the methods of the preceding examples.

In some embodiments, an apparatus comprising means for performing any of the method elements of any of the preceding examples.

In some embodiments, a method may include any action or combination of actions as substantially described herein in the Detailed Description and claims.

In some embodiments, a method may be as substantially described herein with reference to each or any combination of the Figures contained herein, with reference to each or any combination of paragraphs in the Detailed Description, with reference to each or any combination of Figures and/or Detailed Description, or with reference to each or any combination of the claims or examples.

In some embodiments, a wireless device may be configured to perform any action or combination of actions as substantially described herein in the Detailed Description, Figures, examples, and/or claims.

In some embodiments, a wireless device may include any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit may be configured to perform any action or combination of actions as substantially described herein in the Detailed Description and/or Figures.

In some embodiments, a mobile station may be configured to perform any action or combination of actions as substantially described herein in the Detailed Description and/or Figures.

In some embodiments, a mobile station may include any component or combination of components as described herein in the Detailed Description and/or Figures as included in a mobile station.

In some embodiments, a mobile device may be configured to perform any action or combination of actions as substantially described herein in the Detailed Description and/or Figures.

In some embodiments, a mobile device may include any component or combination of components as described herein in the Detailed Description and/or Figures as included in a mobile device.

In some embodiments, a network node may be configured to perform any action or combination of actions as substantially described herein in the Detailed Description and/or Figures.

In some embodiments, a network node may include any component or combination of components as described herein in the Detailed Description and/or Figures as included in a mobile device.

In some embodiments, a non-access point multi-link device may be configured to perform any action or combination of actions as substantially described herein in the Detailed Description and/or Figures.

In some embodiments, a non-access point multi-link device may include any component or combination of components as described herein in the Detailed Description and/or Figures as included in a mobile device.

In some embodiments, an access point multi-link device may be configured to perform any action or combination of actions as substantially described herein in the Detailed Description and/or Figures.

In some embodiments, an access point multi-link device may include any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-access point (AP) multi-link device (MLD)(non-AP MLD), comprising:
    a radio; and
    a processor operably coupled to the radio and configured to cause the non-AP MLD to:
        establish communication with an AP MLD on a first channel using a first affiliated AP of the AP MLD, wherein establishing communication comprises:
            performing a handshake with the AP MLD;
            validating the first affiliated AP; and
            receiving information associated with a second affiliated AP of the AP MLD; and
        validate the second affiliated AP of the AP MLD based at least on the information.

2. The non-AP MLD of claim 1, wherein validating the second affiliated AP comprises:
    receiving a beacon associated with the second affiliated AP on a second channel different from the first channel.

3. The non-AP MLD of claim 2, wherein validating the second affiliated AP further comprises:
    transmitting data to the AP MLD using the second affiliated AP on the second channel.

4. The non-AP MLD of claim 1, wherein receiving the information occurs during one of:
    a multi-link setup; or
    a fast multi-link transition.

5. The non-AP MLD of claim 1, wherein the information comprises a multi-link operating channel information element.

6. The non-AP MLD of claim 5, wherein the multi-link operating channel information element is received in a message 3 (MSG3) associated with the handshake.

7. The non-AP MLD of claim 1, wherein the processor is further configured to cause the non-AP MLD to:
    receive second information associated with a third affiliated AP of the AP MLD.

8. The non-AP MLD of claim 7, wherein the processor is further configured to cause the non-AP MLD to:
    validate the third affiliated AP of the AP MLD based at least on the second information.

9. A method, comprising:
    at an access point (AP) multi-link device (AP MLD):
        establishing communication with a non-AP MLD on a first channel using a first affiliated AP of the AP MLD, wherein establishing communication comprises:
            performing a handshake with the non-AP MLD; and
            transmitting, to the non-AP MLD, information for validating a second affiliated AP of the AP MLD; and
        exchanging data with the non-AP MLD via the second affiliated AP.

10. The method of claim 9, wherein the information for validating the second affiliated AP is transmitted in a message 3 (MSG3) associated with the handshake.

11. The method of claim 10, wherein the message 3 (MSG3) also includes information for validating the first affiliated AP.

12. The method of claim 10, wherein the message 3 (MSG3) also includes information for validating a third affiliated AP of the AP MLD.

13. The method of claim 9, wherein the information for validating the second affiliated AP is transmitted during a multi-link setup operation.

14. The method of claim 9, wherein the information for validating the second affiliated AP is transmitted during a fast multi-link transition.

15. The method of claim 9, wherein the information for validating the second affiliated AP is transmitted in a response to a query request received from the non-AP MLD.

16. An apparatus, comprising:
    a processor configured to cause a non-access point (AP) multi-link device (MLD) (non-AP MLD) to:
        establish communication with an AP MLD on a first channel using a first affiliated AP of the AP MLD, wherein establishing communication comprises performing a handshake with the AP MLD;
        receive a beacon from a second affiliated AP of the AP MLD;
        transmit an authentication request to the AP MLD;
        receive an association request from the AP MLD, the association request comprising information associated with the second affiliated AP; and
        validate the second affiliated AP based on the information associated with the second affiliated AP.

17. The apparatus of claim 16, wherein to validate the second affiliated AP, the processor is further configured to cause the non-AP MLD to:
    compare at least one attribute of the beacon to a corresponding attribute of the information associated with the second affiliated AP.

18. The apparatus of claim 17, wherein the at least one attribute comprises an operating class.

19. The apparatus of claim 17, wherein the at least one attribute comprises a primary channel number.

20. The apparatus of claim 16, wherein the information comprises a multi-link operating channel information element.

* * * * *